(12) United States Patent
Olson et al.

(10) Patent No.: US 7,927,396 B2
(45) Date of Patent: Apr. 19, 2011

(54) EVACUATION VALUE ARRANGEMENTS; PULSE JET AIR CLEANER SYSTEMS USING SAME; AND, METHOD

(75) Inventors: Thomas R. Olson, Prior Lake, MN (US); Gary Gillingham, Prior Lake, MN (US); Fred Wahlquist, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 200 days.

(21) Appl. No.: 12/383,205

(22) Filed: Mar. 19, 2009

(65) Prior Publication Data
US 2009/0308034 A1 Dec. 17, 2009

Related U.S. Application Data

(60) Provisional application No. 61/070,323, filed on Mar. 20, 2008.

(51) Int. Cl.
*B01D 51/00* (2006.01)
(52) U.S. Cl. ............... 55/418; 55/417; 55/420; 55/429; 55/301; 55/302; 55/282; 55/495; 55/498; 95/280
(58) Field of Classification Search ............... 55/301, 55/417, 418, 420, 428, 282, 495, 498, 429; 95/280; 29/525.01
See application file for complete search history.

(56) References Cited

U.S. PATENT DOCUMENTS

| | | | |
|---|---|---|---|
| 1,751,982 A | | 3/1930 | Dunham |
| 3,898,065 A * | | 8/1975 | Coffman .................... 55/301 |
| 3,985,657 A * | | 10/1976 | Coughlan .................. 210/440 |
| 4,388,091 A | | 6/1983 | Khosropour |
| 5,250,176 A * | | 10/1993 | Daniel ....................... 210/130 |
| 6,096,199 A * | | 8/2000 | Covington ................. 210/130 |
| 6,419,718 B1 * | | 7/2002 | Klug et al. ................... 55/320 |
| 7,070,642 B2 * | | 7/2006 | Scott et al. ................... 55/498 |
| 7,517,393 B2 * | | 4/2009 | Richard ...................... 95/280 |
| 7,524,349 B2 * | | 4/2009 | Schrage et al. ............. 55/502 |
| 7,537,631 B2 * | | 5/2009 | Scott et al. ................... 55/498 |
| 7,662,203 B2 * | | 2/2010 | Scott et al. ................... 55/498 |

FOREIGN PATENT DOCUMENTS

| | | |
|---|---|---|
| GB | 1 450 573 | 9/1976 |
| WO | 82/01325 | 4/1982 |
| WO | 2007/149388 | 12/2007 |

OTHER PUBLICATIONS

International Search Report and Written Opinion corresponding to PCT/US2009/037670.

* cited by examiner

*Primary Examiner* — Jason M Greene
*Assistant Examiner* — Dung Bui
(74) *Attorney, Agent, or Firm* — Merchant & Gould P.C.

(57) ABSTRACT

Methods, techniques, and constructions are provided for use to apply an evacuation valve arrangement on an air cleaner assembly that is configured for pulse jet operation. An example evacuation valve arrangement is provided which comprises a valve member in the form of a sleeve that extends completely around a sidewall portion of an air cleaner housing of a pulse jet air cleaner. Examples are depicted in which the sidewall portion can comprise: a portion of a housing sidewall section that surrounds an installed filter cartridge, in use; a portion of an access cover; or, a drop tube secured to a portion of the housing, for example either on an access cover or on another portion of a housing. Specific features and alternatives are described. Also, methods of assembly and operation are described.

26 Claims, 17 Drawing Sheets

EVACUATION VALUE ARRANGEMENTS; PULSE JET AIR CLEANER SYSTEMS USING SAME; AND, METHOD

CROSS-REFERENCE TO RELATED APPLICATION

The present application includes the disclosure of, with edits, U.S. application Ser. No. 61/070,323, filed Mar. 20, 2008. The complete disclosure of U.S. 61/070,323 is incorporated herein by reference. Also a claim of priority is made to U.S. application 61/070,323, to the extent appropriate.

FIELD OF THE DISCLOSURE

The present disclosure relates to air cleaner arrangements. It particularly concerns dust evacuation valve arrangements, for pulse jet air cleaner systems.

BACKGROUND OF THE INVENTION

The present disclosure relates to air cleaner arrangements used for example, in vehicles and other equipment. It particularly concerns air cleaners with pulse jet systems, allowing for selected pulse jet cleaning of serviceable filter cartridges therein. This allows for extended service life of filter cartridges and operating life for the vehicle or other equipment before servicing as needed.

A variety of systems for pulse jet air cleaning are known. Examples described in U.S. Pat. Nos. 5,401,285; 5,575,826; 5,683,479, are pulse jet air cleaning systems for vehicles such as the M1 tank. Others described in U.S. Pat. Nos. 6,676,721; 6,872,237; and 6,908,494, are pulse jet air cleaners for a media pack usable in heavy duty equipment such as mining equipment or ore haulers. Each of the previously identified six U.S. patents is incorporated herein by reference.

Further examples of pulse jet arrangements are described in PCT/US07/14187, filed Jun. 18, 2007, and incorporated herein by reference, in its entirety. The PCT application PCT/US07/14187, published as WO 2007/149388 on Dec. 27, 2007, was filed with priority claims to each of three previously filed U.S. provisional applications: 60/814,744, filed Jun. 19, 2006; 60/848,320, filed Sep. 29, 2006; and 60/921, 173, filed Mar. 30, 2007. Each of these three provisional applications is also incorporated herein by reference.

In general terms, some pulse jet air cleaner arrangements such as those described in PCT/US07/14187 have an evacuation valve assembly or arrangement thereon. The evacuation valve arrangement allows for evacuation of dust, water and air pressure from an interior of the air cleaner assembly, during a pulse jet cleaning operation. The present application relates to improvements in such evacuation valve arrangements and their use.

SUMMARY

According to the present disclosure, evacuation valve arrangements particularly adapted for use with pulse jet air cleaner systems are provided. In general terms, the evacuation valve arrangements comprise a flexible valve member positioned, operably, over a port arrangement through a sidewall, i.e. a sidewall portion, of an air cleaner housing. Typically, the portion of the air cleaner housing over which the valve member is positioned, is arcuate; and, typically, the valve member has an inner surface which, in installation, is arcuate and concave; the inner surface being that surface directed against the air cleaner assembly arcuate surface. An example valve member is described, which comprises a sleeve member extending completely around a housing (i.e. housing portion) of the air cleaner assembly. Alternative arrangements are described.

The valve member is mounted such that an edge or portion of the valve member is free to flex away from the air cleaner assembly, during a pulse jet operation. The valve member is held in place by a holder arrangement. An example holder arrangement is described which comprises a hoop clamp mounted in extension around the air cleaner housing (or housing portion).

A method of field modification of certain embodiments of the evacuator valve assembly is described, for a water fording operation of the equipment on which the air cleaner assembly is mounted. The field modification described involves positioning a holder, for example a hoop clamp, over the valve member in a manner closing the valve member, for the water fording operation.

Methods of assembly and use are described. Also, features of typical air cleaner assemblies, with which the evacuation valve assembly can be used, are described.

It is noted that the principles described herein can be applied with evacuator valve arrangements that extend around various alternate portions of the air cleaner housing. In examples described, an arrangement is depicted with an evacuator valve that extends around the main body portion of the housing, into which the cartridge is installed, see for example FIGS. 1-5, 10 and 11. Also in examples described, the evacuator valve assembly includes a sleeve valve that extends around a perimeter of an access cover, see for example FIGS. 6-9.

It is noted that a sleeve vac valve can be positioned around other portions of a housing as well. For example, some air cleaner housings are configured with a dust/water drop tube thereon. Such drop tubes are typically positioned on the housing to either being positioned in a downwardly directed location on the access cover or by being positioned in a downwardly directed location on the housing body into which a cartridge is installed. Examples of evacuator valve arrangements having sleeve valves thereon, which can implemented in such circumstances, are described herein in connection with FIGS. 12-17.

DETAILED DESCRIPTION

I. An Example System FIGS. 1-5

It is noted that the principles described herein relate to providing an improved dust evacuation system for a pulse jet air cleaner assembly. An example of such an assembly is depicted in FIGS. 1-5. The assembly of FIGS. 1-5 is generally in accord with selected features characterized in the description of PCT/US07/14187, except for modifications relating to the dust evacuation system. It is noted that the principles of the dust evacuation system described herein can also be applied in air cleaners having a variety of alternate features.

Figure 1:
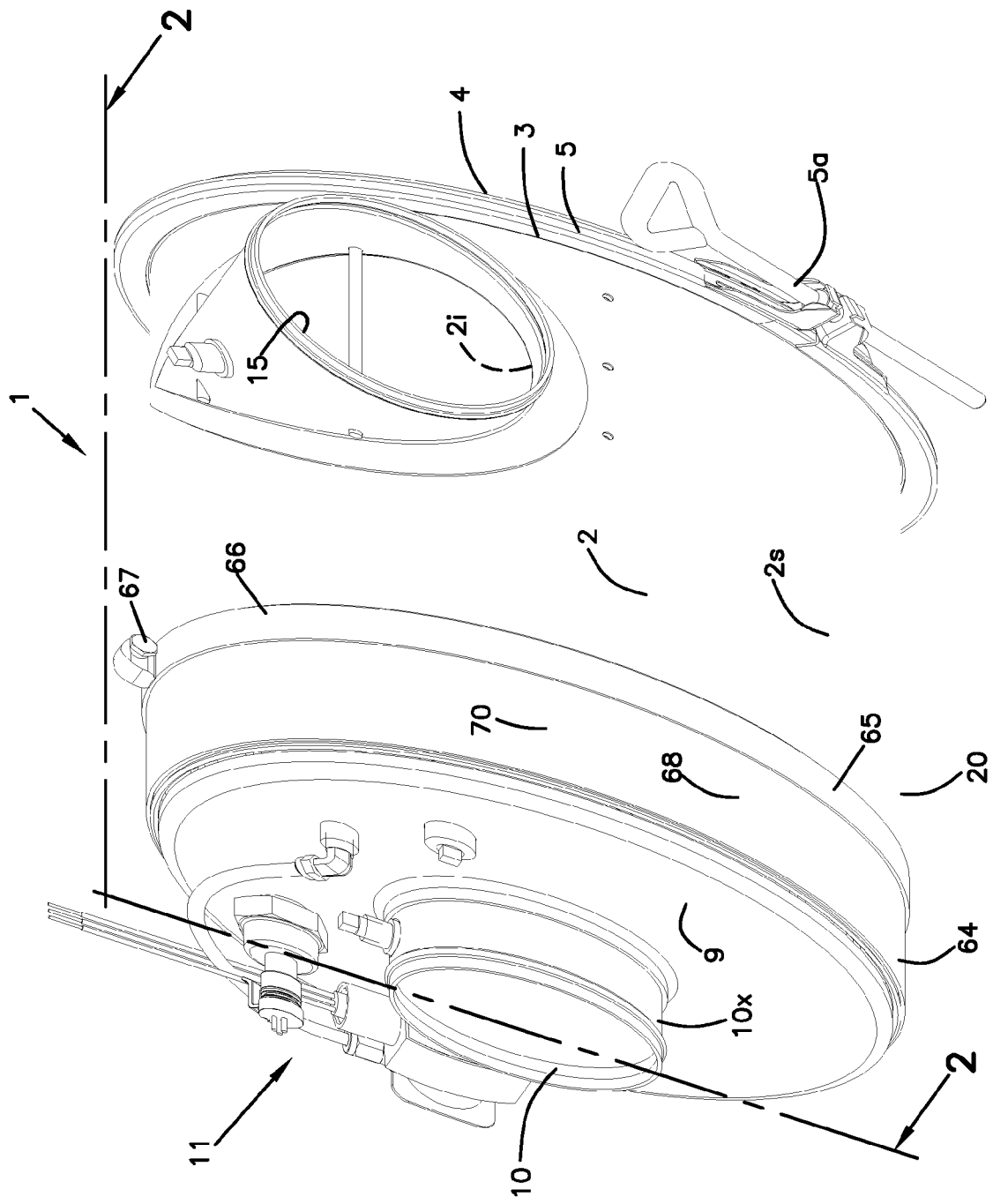
FIG. 1 is a schematic perspective view of an air cleaner assembly including selected features according to the present disclosure.

In general, reference numeral 1, FIG. 1, designates an air cleaner assembly according to the present disclosure. The air cleaner assembly 1 includes a housing 2, comprising a housing body 2a having an end 3. The housing 2 also includes an access cover 4, closing end 3 of body 2a. The access cover 4 is removably secured in place, in the example shown by mounting band assembly 5. Opposite to end 3 is provided a closed end 9, through which extends air flow outlet 10 comprising an outlet tube 10x for flow of filtered air from assembly 1. Mounted on closed end 9 is included various equipment 11 relating to charging, operating and controlling pulse jet operation within the assembly 1.

Referring still to FIG. 1, housing 2 includes an air flow inlet arrangement 15. In operation, intake air flows into housing 2 through air flow inlet arrangement 15. Within housing interior 2i, the housing 2 is provided with a serviceable filter cartridge (not viewable in FIG. 1), see FIG. 2 at 20. In operation, the air flows through the filter cartridge 20 to a clean air interior 22. The filtered air then flows out from the clean air interior 22, and the housing 2, through air flow outlet tube 10x. The filtered air is eventually directed to an engine air intake, for the vehicle or other equipment involved.

Figure 2:
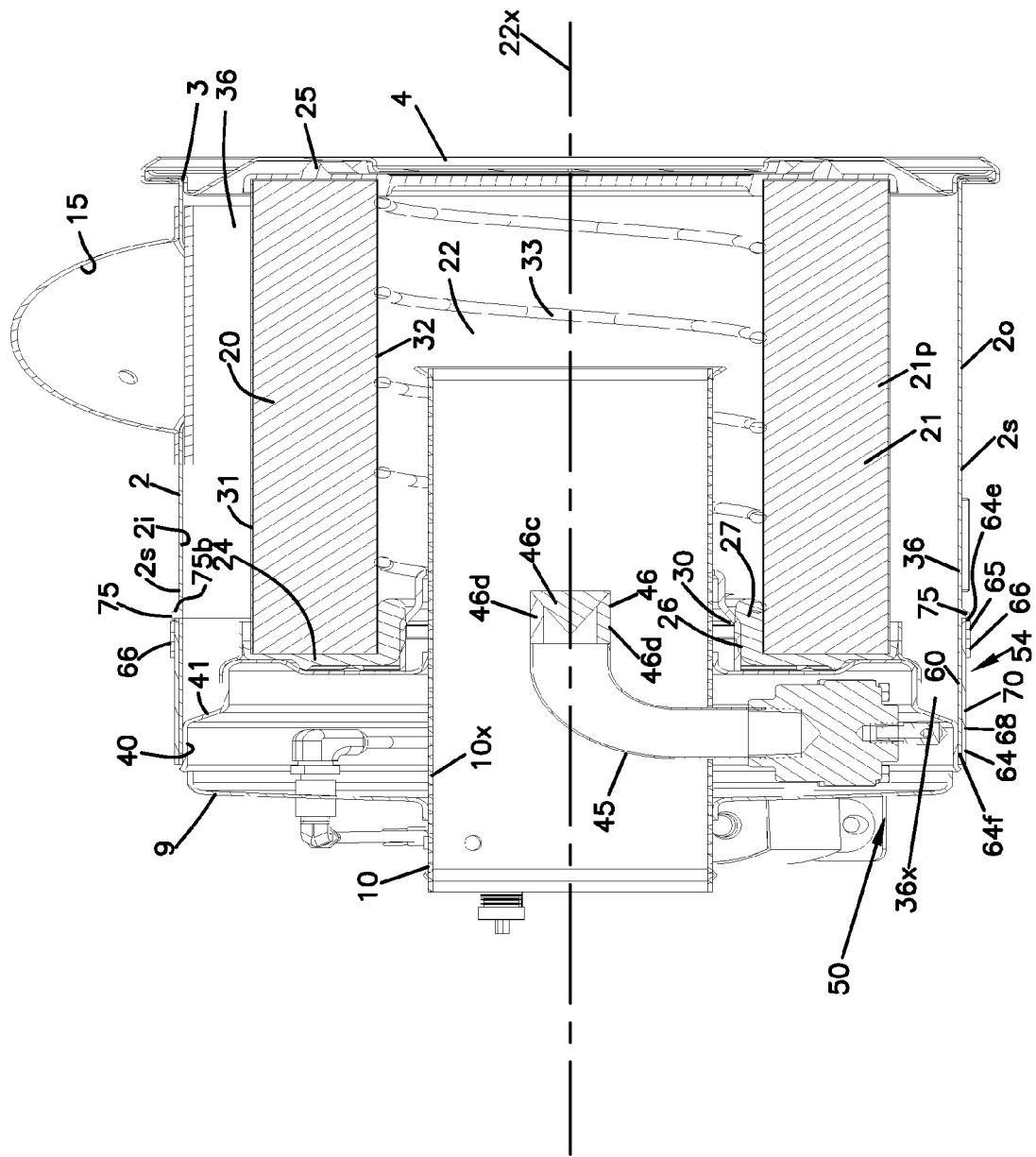
FIG. 2 is a schematic cross-sectional view of the air cleaner assembly of FIG. 1, taken generally along line 2-2, of FIG. 1.

Cartridge 20, FIG. 2, received within housing interior 2i, is a removable (or service) part; i.e., it can be removed from interior 2i for servicing. In particular, the housing 20 of assembly 1 includes an operable access cover 4. For the example housing 2 depicted, when bolt 5a (FIG. 1) is loosened, band 5 is loosened allowing the access cover 4 to be removed. Once access cover 4 is removed, the cartridge 20 can be removed from the assembly 1 for servicing.

Attention is now directed to FIG. 2, a schematic cross-sectional view taken generally along line 2-2, FIG. 1. Referring to FIG. 2, interior 2i of housing 2 is viewable. Filter cartridge 20 is depicted operably positioned within interior 2i of body 2. By the term "operably", in this and related contexts, a feature characterized is meant to be referenced with respect to its proper and intended position for normal operation of the assembly 1. In this instance, cartridge 20 is depicted operably positioned as it would be oriented for a normal filtering operation of the air cleaner assembly 1.

The cartridge 20 comprises media 21, in the example shown surrounding an open filter (clean air) interior 22. In the particular example, the media 21 is pleated media 21p, comprising pleats or flutes. The media 21 (and typically, when pleated, each pleat) extends between first and second end caps 24, 25. The first end cap 24 is an open end cap, having a central air flow aperture 26 therethrough. The second end cap 25 is typically closed, having no air flow aperture therethrough.

End cap 24 is provided with a seal member 27 for sealing the cartridge 20 in place against a remainder of the air cleaner assembly 1, when the cartridge 20 is operably installed. That is, seal member 27 prevents unfiltered air from entering clean air interior 22, or outlet tube 10x. For the particular example depicted, seal member 27 is an inwardly directed radial seal member, which forms a radially directed seal around housing seal support 30, when the cartridge 20 is operably installed. By "radially directed" in this context, it is meant that a compression force or sealing force is generally directed toward or away a central longitudinal axis 22x of the housing 2 and cartridge 20. By the term "inwardly directed" in this context, it is meant that the seal face on the cartridge 20 is generally directed inwardly toward the central axis 22x, when in engagement to the seal support 30. Alternate seal arrangements can be used, with the principles of the present disclosure.

Although alternatives are possible, for the particular example cartridge 20 depicted, end caps 24 and 25 are each molded-in-place, each comprising molded-in-place polymer material. A typical usable polymer will comprise a polyurethane, for example a foamed polyurethane. Although a variety of materials can be used, typically for each of the end caps 24, 25, a foamed polyurethane will be used that will cure to an as molded density of no greater than 30 lbs/cu. ft. (0.46 g/cc), typically no greater than 15 lbs/cu. ft. (0.24 g/cc), and sometimes no greater than 10 lbs/cu. ft. (0.16 g/cc). The resulting material will typically be formed with a hardness, Shore A, of no greater than 30, typically no greater than 25, and often within the range of 12-20, inclusive. (By "inclusive" in this context, herein, it is meant that the end numbers are intended to be included in the stated range.)

The cartridge 20 may be provided with an outer support or liner 31. Various materials can be used for the outer support 31, when present. Examples include: expanded metal liners; perforated metal liners; and, plastic mesh liners, although alternatives are possible. The liner 31 will help support the media 21 during pulse jet cleaning.

Interior structural support along media interior 32 can be provided by a liner, and/or for other structure. For the particular example cartridge 20 depicted in FIG. 2, interior support is also provided by coil 33. The coil 33 generally comprises an adhesive coil, for example used to manage pleat spacing. This is expected that typically the interior 32 would also include perforated liner, for example perforated plastic plastic or expandable metal liner.

In general terms, although alternatives are possible, cartridge 20 can be generally in accord with the cartridges described in PCT/US07/14187, incorporated herein by reference.

It can be seen, referring to FIG. 2, that when access cover 4 is removed, cartridge 20 can be removed from interior 2i. Servicing will typically involve one of: refurbishment of cartridge 20 and its reinstallation; replacement with a new cartridge 20; or, replacement with a refurbished, but previously used, cartridge 20. In general, the term "servicing" as used herein, is not meant to be specific with respect to any of these alternatives, or variations of them, unless otherwise specified.

Still referring to FIG. 2, housing 2 defines a sidewall 2s surrounding cartridge 20 and spaced therefrom by air flow annulus 36. Air flow annulus 36 is a "dirty air" or "unfiltered air" flow annulus. That is, unfiltered air, typically from the environment, enters the air cleaner housing 2 through inlet 15, and is directed into air flow annulus 36, generally in a circular or cyclonic pattern. Air then passes through the media 21 to clean air interior 22. The air then flows through outlet arrangement 10, for flow exit from assembly 1.

It is noted that in some systems, some or all of the air entering the air flow annulus 36 may be from a previous filtered source or pre-cleaner. However within the context of the descriptions herein, the air will be referred to as "dirty" and/or "unfiltered", since it has not yet been filtered, with respect to this flow passage through air cleaner assembly 1, by cartridge 20.

Still referring to FIG. 2, air cleaner 1 is a pulse jet air cleaner assembly, in this example including selected pulse jet cleaning features generally in accord with PCT/US07/14187, incorporated herein by reference. Herein, the term "pulse jet air cleaner assembly" is meant to refer, in general, to an air cleaner assembly constructed and configured to selectively direct a pulse jet of gases (typically air) through a filter cartridge installed therein, in a direction reverse to normal air filtering flow. This pulse jet operation will clean dust from filter cartridge 20, which can be removed from housing 2.

It is noted that the particular air cleaner assembly 1 depicted as an example, includes depicted features with respect to the pulse jet air cleaner operation. These are generally characterized herein, and it will be understood that variations can be made while practicing selected applications of the presently described evacuation valve assembly principles.

The example air cleaner assembly 1 depicted includes a compressed gas (typically air) charge tank 40 surrounded by a portion of sidewall 2s. The compressed gas tank 40 is generally defined by outer wall 9 and an inner wall 41. For the particular example depicted, the air tank 40 is positioned surrounding outlet air flow tube 10x, which passes therethrough.

The air cleaner assembly 1 further includes a pulse jet conduit 45 and a pulse jet distributor 46. In accord with general pulse jet operation principles, examples of which are described herein, when valve arrangement 50 is actuated, a gas pulse from charge tank 40 is directed into conduit 45 and through distribution assembly 46. This will cause an air pressure pulse through media 21 in a direction from interior 22 toward annulus 36. Such a pressure pulse will cause at least a portion of the dust collected on the media 21 to drop off. This dust, or at least a portion of it, can be evacuated from interior 2i through dust evacuator assembly 54, as discussed below. In general, pulse jet distributor 46 spreads or distributes the pulse in a select pattern within assembly 1. The example distributor 46 depicted, comprises a conical distributor member 46c supported by spaced posts 46d. Thus, the example distributor 46 depicted will distribute the pulse from conduit 45 in an expanding cylindrical (circular) pattern. Such a pulse jet distributor 46 is described in PCT/US07/14187.

Analogously to the assemblies described in PCT/US07/14187, air cleaner assembly 1 can include an inlet valve arrangement operably positioned in or across inlet 15. The valve arrangement will generally be configured to close during a pulsing operation, to inhibit dust evacuation outwardly through air flow inlet 15. An example valve arrangement would comprise a single piece flap valve positioned to flex inwardly (away from housing sidewall 2s) and open, under normal flow; and also, positioned to bias outwardly, closing inlet 15, under a pressure pulse from the pulse jet distributor 46. An example of such valve arrangement was described and depicted in PCT/US07/14187, at FIGS. 24 and 25, see discussion therein of flap 2015.

In general terms, as thus far described the assembly 1, (except for specific detail of the dust evacuator assembly 54), is generally in accord with the arrangements and principles described in PCT/US07/14187, previously incorporated herein by reference. Many of the variations described in that document, can be implemented in assemblies in accord with the present disclosure, if desired.

The dust evacuator assembly 54 provided herein, generally provides for advantages over the dust evacuator arrangements described in PCT/US07/14187, for certain applications. The advantages relate to features that can be implemented in a form to provide for the following:

(a) ease of assembly;

(b) low clearance for space desirability;

(c) in some instances, if desired, arrangements that are configured for ease of field modification to be sealed closed during a water fording by the equipment on which the air cleaner assembly is mounted; and, (d) cost and simplicity with respect to componentry and operation.

Before these advantages are discussed in additional detail, the example dust evacuation assembly 54 depicted, will be further described.

Figure 3:
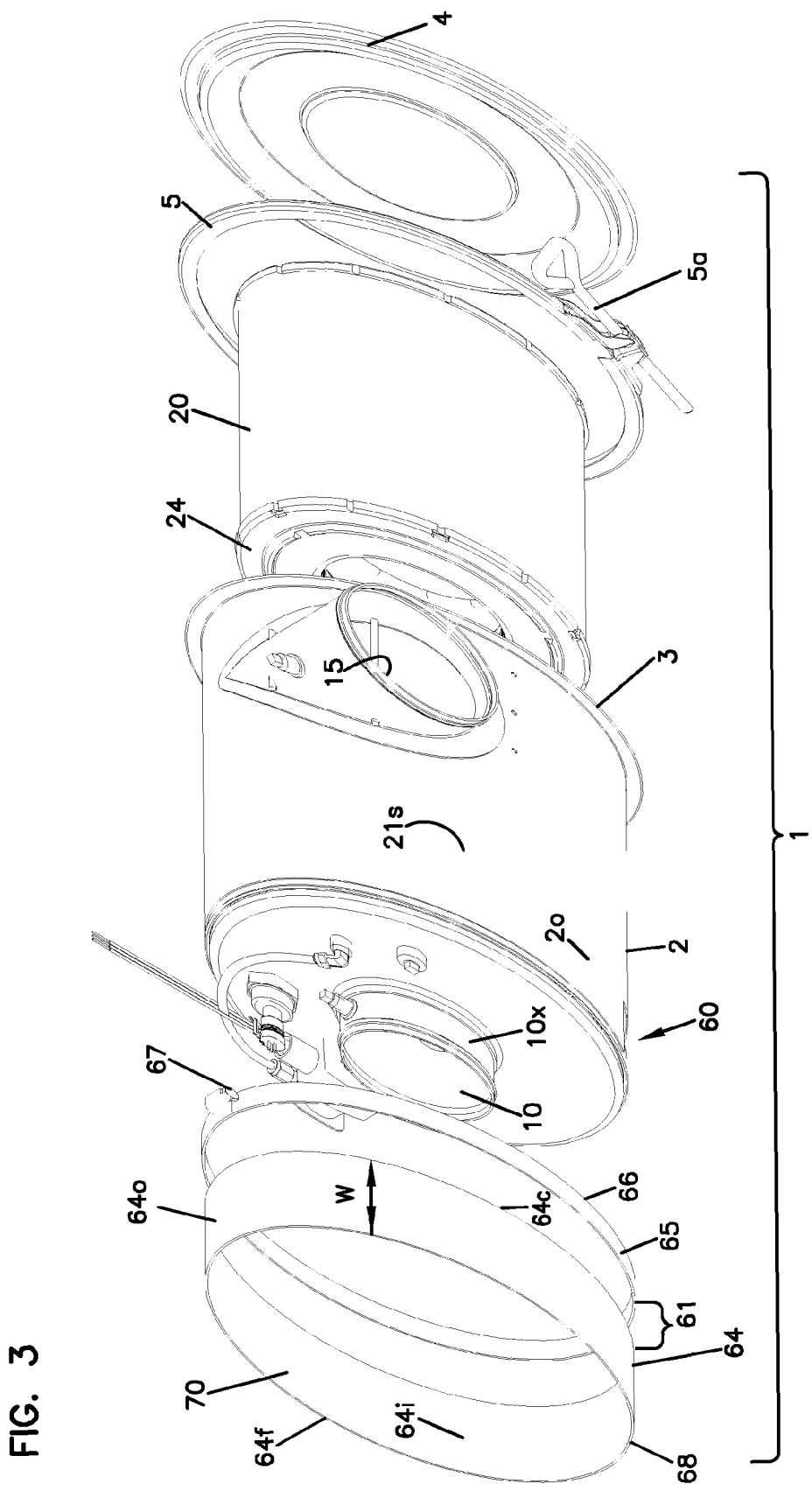
FIG. 3 is a schematic, exploded, perspective view of the air cleaner assembly of FIG. 1.

In connection with this, attention is directed to FIG. 3, an exploded perspective view of air cleaner assembly 1. Referring to FIG. 3, housing body 2a, with open end 3, is viewable. Cartridge 20 is depicted removed therefrom. Access cover 4 and mounting band 5 are shown dismounted from housing body 2a.

In FIG. 3, componentry of the dust evacuation assembly 54, of FIG. 2, is viewable. In general terms, the dust evacuation assembly 54 includes: housing evacuation port arrangement 60, in the housing 2; and, evacuation valve arrangement 61. For the particular example assembly 1, FIG. 2, dust housing evacuation port arrangement 60 is positioned in the housing body 2a. In alternatives, as discussed below, the housing evacuation port arrangement can be positioned in the access cover or cover assembly, or in a drop tube. This is discussed below in connection with other figures.

Referring again to FIG. 3, housing evacuation port arrangement 60 comprises one or more apertures or cutaways in the housing 2, in the example, in sidewall 2s, which communicate between the exterior environment and annulus 36, FIG. 2, for removal of dust therefrom. That is, dust can pass outwardly through the housing evacuator port arrangement 60 and thus can be evacuated from interior 2i of housing 2.

Typically, the housing evacuation port arrangement 60 is at least positioned in a portion of the housing 2 which is directed generally downwardly, in normal installation of the air cleaner assembly 1. This is because dust and water evacuation, through the port arrangement, will be facilitated by such a positioning.

The evacuation valve arrangement 61 is operably positioned in covering engagement with the port arrangement 60. Generally the valve arrangement 61 is configured such that during normal air filtering operation, the evacuation valve arrangement 61 is closed, closing port 60 to passage of air, dust and water therethrough. However, the evacuation valve arrangement 61 is configured such that when a pulse cleaning operation occurs, the valve arrangement 61 will open under interior pressure increase within housing interior 2i, allowing for pressure release and dust evacuation from interior 2i. Also, in some instances, if water has collected within the interior 2i, it can be evacuated through port arrangement 60 during such a pulse jet operation.

In general terms, the evacuation valve arrangement 61 can be viewed as a one-way valve. By this it is meant the valve arrangement 61 will generally be closed, except when biased by internal pressure within air cleaner assembly 1, to allow pressure generated by a pulse jet cleaning operation to escape, along with dust. In a normal operation of the air cleaner assembly 1, to filter inlet air, the evacuation valve arrangement 61 would be closed.

For the particular example pulse jet air cleaner assembly 1 depicted in FIGS. 1-5, the valve arrangement 61 comprises a flexible valve member or arrangement 63 including at least one flexible valve member 64 and a retaining (holder) arrangement 65. The retaining or holder arrangement 65 is mounted on the housing 2, in the particular example depicted on the housing body 2a, in a manner securing the flexible valve member 64 in place, with a portion of the valve member extending over port 60. For the particular example arrangement depicted, the retaining or holder arrangement 65 is mountable on, and is selectively removable from, housing 2. However, many of the principles of the present disclosure can be practiced in an arrangement in which the retaining or holder arrangement 65 is permanently mounted to the housing 2.

The particular example retaining or holder arrangement 65 depicted, is a circular hoop clamp 66 (analogous to a large hose clamp) that can be tightened in place by bolt 67. That is, hoop clamp 66 can be selectively tightened in place, or can be loosened and dismounted from the assembly 1, as desired.

Still referring to FIG. 3, the example evacuation valve member 64 is a flexible member 68 which can generally rest flush against an outer surface 2o of housing 2, in the example shown against housing body 2a, when installed. Although alternatives are possible, typically valve member 64 has an overall thickness of no greater than 0.2 inch (5.1 mm), usually no greater than 0.125 inch (3.2 mm); typically no greater than 0.08 inch (2 mm).

In a particular example depicted in FIG. 3, the valve member 64 is mounted over a portion of the outer surface 2o of the housing 2; and, the valve member 64 is not mounted on a structure or frame that projects radially outwardly from the outer surface 2o. Also, as discussed in greater detail below, for the particular example arrangement depicted in FIG. 3, the valve member 64 is positioned against a portion of the outer surface 2o of the housing body sidewall 2s which is itself arcuate or curved, and is not planar.

A typical application will be understood by reference to air cleaner assembly 1, FIGS. 1-3. The housing port arrangement 60 is a passageway through a portion of sidewall 2s which is arcuate; and, valve member 64 has an inner surface 64i which is typically arcuate and concave (in installation), that is directed against sidewall 2s. Further, an outer surface 64o, opposite inner surface 64i, is arcuate and convex. Typically the arcuate length or extent of valve member 64, and the inner surface 64i, will be at least 20°, usually at least 90°, typically at least 180°, often at least 270° and in some instances 360°. When the extension is 360°, of course, the value member 64 is continuous in extension completely around housing 2. Typically the arc of curvature of the housing sidewall 2s is circular, or nearly circular, as, also, would typically be the curvature of convex surface 64i. It is noted, however, that the curvature of the housing sidewall 2s and convex surface 64i can be modified from circular. Circular shapes to sidewall 2s may be typical, as it is convenient for manufacturing, especially when sidewall 2s is a metal structure.

Herein, when it is said that the inner surface (for example 64i) of a valve member (for example valve member 64) is arcuate and concave "in installation", it is meant that as mounted on the housing 2, the inner surface is arcuate and concave. That is, the valve member 64 may be configured, in some applications and techniques described herein, such that it is a section of flexible material that can rest flat (not arcuate) when not mounted on an arcuate surface of an air cleaner assembly, but which is sufficiently flexible so that it will curve to match the contour of the housing, when mounted thereon, thus providing an arcuate and concave inner surface.

For the particular valve arrangement 61 depicted, the valve member 64 is a continuous sleeve member 70, which, when installed, will extend 360° around the selected portion of housing outer wall 2o. By the term "continuous" in this context, the reference is not meant to indicate whether the member 64 includes any aperture(s) therethrough. Rather, the term "continuous" is simply meant to refer to the fact that the sleeve member 7 extends all the way around the outer surface 2o of housing sidewall 2s. In some instances, the sleeve member 70 can include apertures therethrough, for example positioned not to provide overlap with housing evacuator port arrangement 60. However, typically valve member 64 will be a sleeve member 70, as depicted, with no apertures through the material of the sleeve member 70.

A typical valve member 54, (for example sleeve member 70), has first and second opposite edges 64e, 64f, FIG. 3. For the particular example depicted, edges 64e, 64f extend generally parallel to one another, and, for the example depicted, each defines a circular pattern around housing 2.

Although alternatives are possible, it is expected that typically the sleeve member 70 will be at least 3 inches (76 mm) wide, usually at least 3.5 inches (89 mm) wide, typically 3.5-5.0 inches (89-127 mm) wide, inclusive, in extension between opposite edges 64e, 64f.

In general terms, the mounting or holder arrangement 65, in this instance comprising clamp arrangement 66, is positioned around a portion of valve member 64 and is tightened in place; the clamp 66 being positioned not to interfere with the ability of valve member 64 to bias sufficiently away from housing evacuator port arrangement 60, to allow for dust evacuation.

Referring to FIG. 2, for the particular assembly 1 depicted, the clamp 66 is positioned adjacent to edge 64e. This leaves edge 64f free bias outwardly away from sidewall 2s, under pressure pulse of an interior 2i.

Of course for alternate applications, alternate locations of the clamp 66 (or holder arrangement 65) are possible. Indeed in some instances the clamp 66 (or holder arrangement 65) can be positioned to allow both edges 64e, 64f, to flex. (An example of this is described below in the context of FIG. 8). However, as shown in the example depicted, FIG. 1-5, positioning the holder arrangement 65 adjacent edge 64e, and opposite free edge 64f, is typical for some applications. When this typical arrangement is used, often the clamp 66 (or holder arrangement 65) is configured to not provide clamping that extends more than 50%, and usually not more than 30%, of a distance W, FIG. 3, from edge 64*e* toward edge 64*f*.

Still referring to FIG. 2, surface 2*o* is shown with locator projection 75 projecting radially outwardly therefrom. Locator projection 75 is positioned to facilitate proper positioning of valve member 64 and holder 65. In particular, projection 75 is positioned such that when holder 65 and valve member 64 are positioned, they can be positioned abutting locator projection 75 at one side thereof. Although alternatives are possible, for the particular example assembly 1 depicted, the locator projection 75 comprises a bead 75*b* in housing body sidewall 2*s* projecting continuously around housing body sidewall 2*s*. Typically the locator projection 75 will project outwardly, radially, from adjacent portions of the housing sidewall 2*s*, no more than 0.5 inch (12.7 mm), typically no more than 0.25 inch (6.4 mm).

The example mounting arrangement 65 can be seen as comprising a hoop clamp 66 tightened in place by bolt 67, over edge 64*e*, FIG. 3, of valve member 64, securing the valve member 64 in place. Edge 64*f* of valve member 64, opposite edge 64*e*, is free, i.e., there is no clamp thereover. Thus, when valve member 64 is made from an appropriately flexible material, edge 64*f* can bias away from a portion of housing 2 which it surrounds, opening port arrangement 60 to escape of gases and dust therethrough from interior 2*i*.

Typical operation of the evacuation valve assembly 54 will now be understood. Referring to FIG. 2, housing outer wall 2*o* includes port arrangement 60 extending therethrough. Although alternatives are possible, for the example depicted in FIGS. 1-5, the port arrangement 60 is positioned in a portion of wall 2*s* surrounding a portion of tank 40, and in communication with annulus 36. Port arrangement 60, again, is typically oriented in a portion of housing wall 2 that is directed downwardly, during installation. For the example depicted in FIGS. 1-5, because port arrangement 60 is not fully in direct radial overlap with cartridge 20, but rather is generally overlapped with tank 40, port arrangement 60 is positioned in a region 36*x* of annulus 36 which is a relatively stable air flow space; air flow through media 21 not occurring immediately adjacent port 60. This will help dust and water collection near port 60, during initial cyclonic flow of air into annulus 36.

Referring to FIG. 2, it can be seen that edge 64*f* of the valve member 64 is free, while edge 64*e* is secured under clamp 66. When a pulse occurs, pressure within interior 2*i* increases, and edge 64*f* will bias away from outer surface 2*o*, allowing air escape through port arrangement 60. As air escapes through port arrangement 60, it will carry therewith a portion of dust and other material collected within the interior 2*i*.

Unlike many dust evacuator arrangements such as the one described in PCT/US07/14187, in FIG. 1 at 60, the dust evacuator arrangement 54, FIGS. 1-3, is of relatively low profile. The valve member 64 is not positioned on a structure that projects radially outwardly from adjacent portion of the housing 2 substantially, but rather the valve member 64 lies relatively flush against the housing sidewall 2*s*. Indeed, for dust evacuator arrangement 54, in the preferred embodiment depicted, valve member 64 lies flush against a curved outer surface 2*s* of housing sidewall 2, and are not mounted on framework projecting (radially) outwardly from housing 2.

The maximum radial outward projection of a typical dust evacuator assembly, for example in accord with the example of FIGS. 1-3 will, in many instances, be a maximum projection of the bolt 67 or other fastener on the clamp 66, and will typically be not more than 3 inches (76.2 mm), usually not more than 2 inches (50.8 mm). Further, typically, no portion of the valve member 64, in typical dust evacuator arrangements 54 will project outwardly from adjacent portions of the housing 2 any further than about 0.5 inch (12 mm) and typically no more than about 0.1 inch (2.5 mm)

As a result, dust evacuator assembly 54 is particularly convenient, since it is effective with respect to space management. That is, rigid framework structure projecting away from housing, in order to support valve member thereon, is not needed. Further, referring to the arrangement depicted in FIG. 31 of PCT/US07/14187, the example valve member 64 depicted herein is not surrounded by any projections that project outwardly from regions adjacent port arrangement 60; and, the valve member 64 is positioned over a curved section of sidewall 2*s*.

In the particular example assembly depicted herein, the valve member 64 includes a concave (in installation) inner surface 64*i* which engages the sidewall of the housing 2. This facilitates valve member 64 lying flush against the housing 2, when the housing 2 has an arcuate sidewall 2*s*, and facilitates use of dust evacuator assembly 54 with an air cleaner assembly 1 in which the housing 2 is mounted with a central axis 22*x* thereof extending generally horizontally. Again, when it is said that the valve member 64 includes a concave (in installation) inner surface, or when variants thereof are used, it is meant that the inner surface is concave as installed. Of course, the material could be flat prior to installation, and sufficiently flexible. It is also noted that some of the techniques described herein can be applied in arrangements that are not mounted with a central access extending generally horizontally.

The particular example assembly 54 depicted, provides a valve member 64 secured by a holder 65 adjacent to a first edge 64*e* while a second, opposite, edge 64*f* remains flexible and free to move, during venting. Further, for the particular example depicted, the edge 64*f* of the valve member 64 is directed away from the access cover 4 and toward end 9. This facilitates dust ejection in a preferred direction, during operation.

The particular example assembly depicted in FIGS. 1-3 is relatively easy to assemble. Once the housing 2 is provided with an appropriate port arrangement 60, the example dust evacuation assembly 55 depicted is relatively easily assembled, by merely slipping the hoop clamp 66 and sleeve 70 in place around the air cleaner, and, then tightening the clamp 66.

In addition, the particular evacuator valve assembly 54 depicted in FIGS. 1-5 is convenient for field modification during water fording operations of the equipment on which the air cleaner assembly 1 is mounted. In particular, the air cleaner assembly 1 can be mounted on a vehicle at a location such that a portion of the assembly 1 may be submerged in water, during a water fording operation by the equipment. When desired, the valve arrangement 54 can be configured, in the field, such that it will not allow undesirable water seepage therethrough, into interior 2*i* of air cleaner assembly 1, during such a water fording operation. This is easily conducted, as will be understood by reference to FIG. 5.

Figure 5:
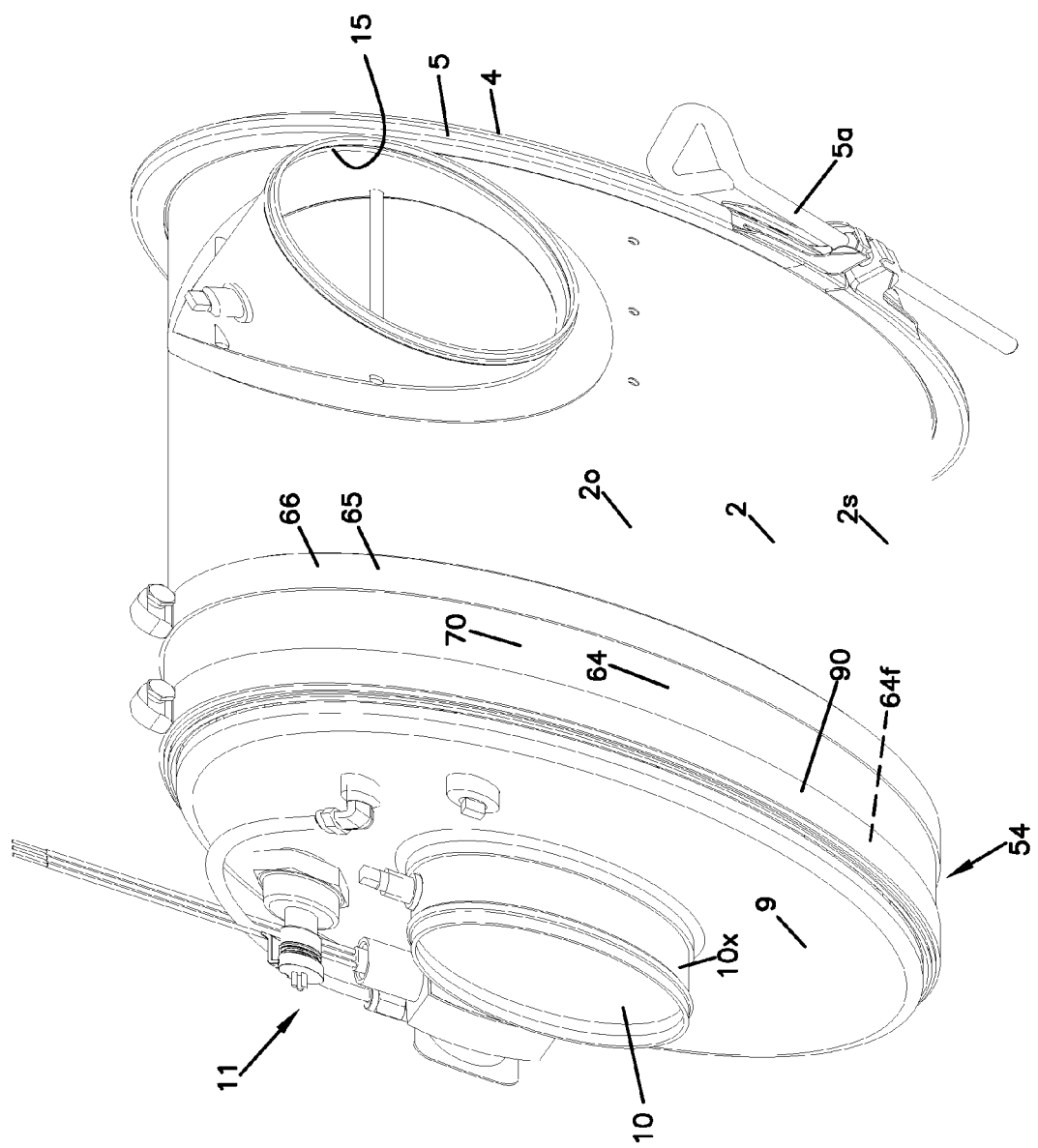
FIG. 5 is a schematic view analogous to FIG. 1, depicting the air cleaner assembly arrangement field modified for vehicle water fording operation.

FIG. 5 is a view analogous to FIG. 1, of the assembly 1, but field modified to facilitate water fording. In FIG. 5, a removable hoop clamp 90 is positioned over edge 64*f* of valve member 64. Clamp 90 could be considered temporary, and could be mounted at the location shown, only for the water fording operation. After the vehicle or the equipment has left the water, clamp 90 would be removed, or moved to elsewhere on the air cleaner, to allow for ordinary operation of the valve arrangement 54. However during the water fording operation, clamp 90 will close valve member 64 and port arrangement 60 to undesirable flow of water into assembly 1.

Figure 4:
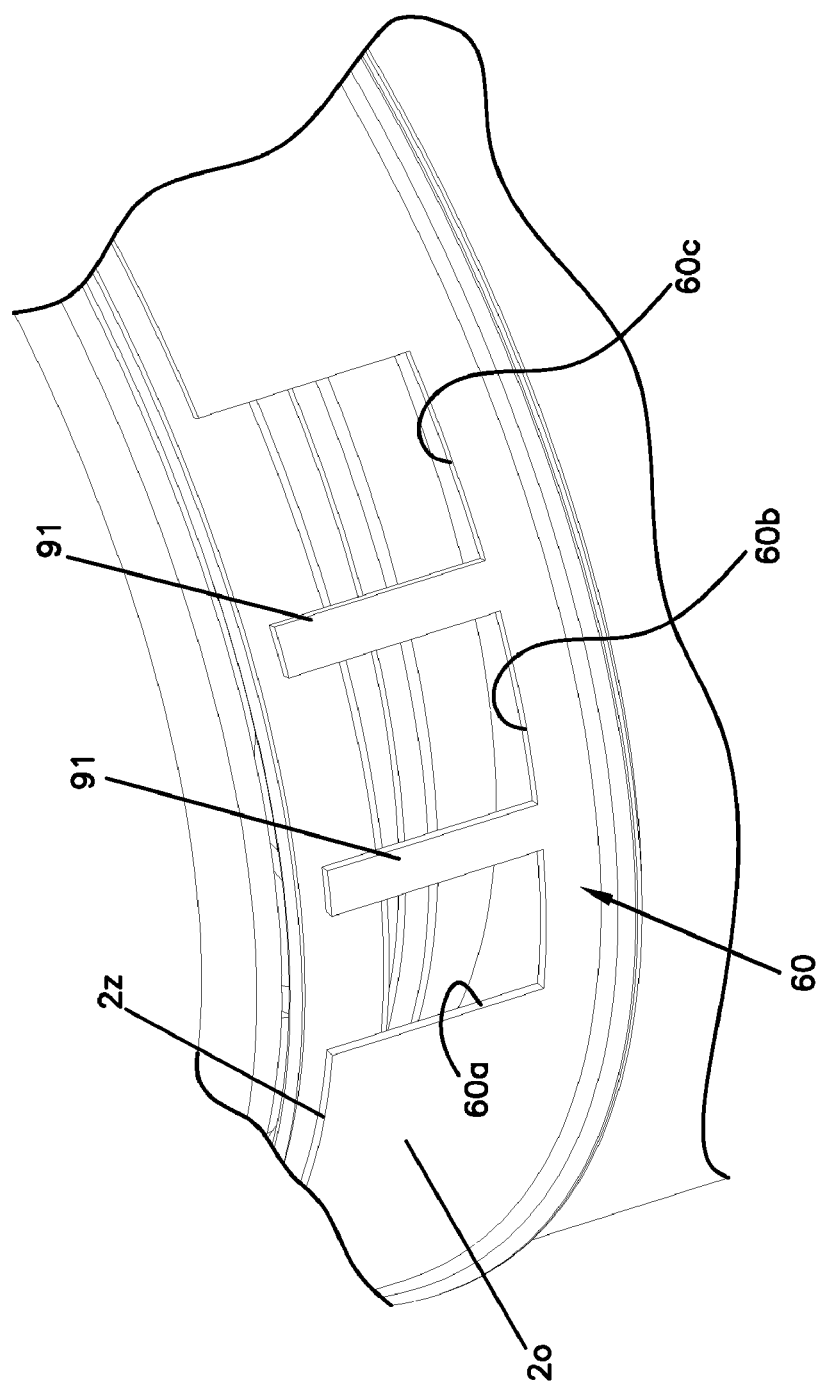
FIG. 4 is an enlarged, fragmentary, schematic view of a portion of a housing component of the assembly depicted in FIG. 3.

Attention is now directed to FIG. 4. In FIG. 4, an enlarged fragmentary schematic view of a portion of housing 2 is depicted, the view being directed toward an exterior portion of the housing 2 in the vicinity of evacuation port arrangement 60. For the particular example depicted, the port arrangement 60 comprises spaced sections 60a, 60b, 60c positioned adjacent to and in communication with edge 2z of sidewall 2s. Edge 2z would generally be an edge which engages end 9, FIG. 1, in assembly.

The size and shape of aperture arrangement 60 is a matter of choice, for the application involved. The size, shape and number of aperture sections (60a-60c) are also a matter of choice. Typically, a valve member support grid or web 91 is provided at locations to ensure that the valve member 64, in extension over aperture arrangement 60, does not deflect substantially (undesirably) into interior 2i of the housing 2.

There is no specific requirement that the individual apertures 60a-60c be in communication with edge 2z.

In a typical arrangement, the valve member 64 will be sized and positioned such that the port arrangement 60 over which it is positioned, lies primarily in a region covered by a portion of the valve member 64 positioned at a location closer to the edge 64f than the edge 64e. Alternately stated, the valve member 64 has opposite edges 64e, 64f, and thus width W. Typically, when positioned adjacent an edge 64f, the valve member 64 is positioned so that a half of the valve member in width closest to the edge 64f covers at least 50% of an open area of the port arrangement 60.

It is desirable to have a sufficiently large aperture area for port arrangement 60, so as to not undesirably restrict rapid air flow through the evacuator valve arrangement. Typically the aperture area of the port arrangement 60 is at least 2 square inches, (12.0 sq. cm), usually at least 4 sq. inches (25.8 sq. cm) often at least 8 square inches (51.6 sq. cm) and in many instances the area can be larger, for example 9 square inches (58 sq. cm) or more. In one example, the port arrangement had an open area of greater than 12 sq. inches (77.4 sq. cm); having been made 2.8 inches×5.75 inches.

Still referring to FIG. 4, it is noted that port arrangement 60 is provided through a portion of surface 2o which is arcuate, i.e., outwardly convex. Again, typically this portion of the sidewall 25 will have a circular radius, although alternatives are possible.

A variety of materials can be used for the sleeve member 70. Typically the sleeve member 70 will be made from a relatively robust, yet flexible weather-resistant, polymeric material. An example would be a rubber or rubber-like material, such as EPDM rubber. An example, fabricated 1/16 inch (1.6 mm) thick by 4 inch (101.6 mm) wide, can be made from a weather resistant EPDM available from McMaster-Carr Supply of PO Box 7690, Chicago, Ill. 60680 as material No. 8990K32.

In general, an EPDM rubber no greater than about 0.5 inch (12.7 mm) thick, usually no greater than about 0.25 inch (6.35 mm) thick, and typically no greater than 0.125 inch thick (3.7 mm) will be used; typical examples being on the order of 0.05-0.08 inch, (1.27-2 mm).

It is noted that there is no specific requirement, in some applications of principles according to the present disclosure, that the valve member 64 comprise a sleeve member 70 that extends completely circumferentially around housing 2. The valve member could be a strip, for example, that extends partially, but not completely, around housing 2. Also, the valve member or arrangement can comprise multiple, separate, sections.

In pulse jet arrangements according to the present disclosure, a variety of equipment and methods can be used for operation of pulse jet equipment. Among those methods usable, are those described in PCT/US07/14187. However, alternate techniques can be applied. Among the variety of approaches usable are: approaches in which a condition of air cleaner operation (for example, restriction) is measured, and when it reaches a threshold level pulsing is actuated; systems in which a pulsing event is based on a time period since the last pulse jet operation or equipment operation; and, hybrid approaches which utilize a combination of both. Various equipment for monitoring and controlling the pulse operation, and/or monitoring conditions within the air cleaner, can be used. Charging of the tank can be conducted from a variety of onboard sources including onboard compressed gas tanks; and, from onboard compressor arrangements.

In a typical application, the charge tank or compressed gas tank will be charged to a pressure of at least 100 psi; and, when pulsing is undertaken, a plurality of pulses (for example 3) will be made in rapid succession. Alternatives are possible.

II. Some Alternate Applications of Selected Ones of the Above Principles

FIGS. 6-8

Figure 7:
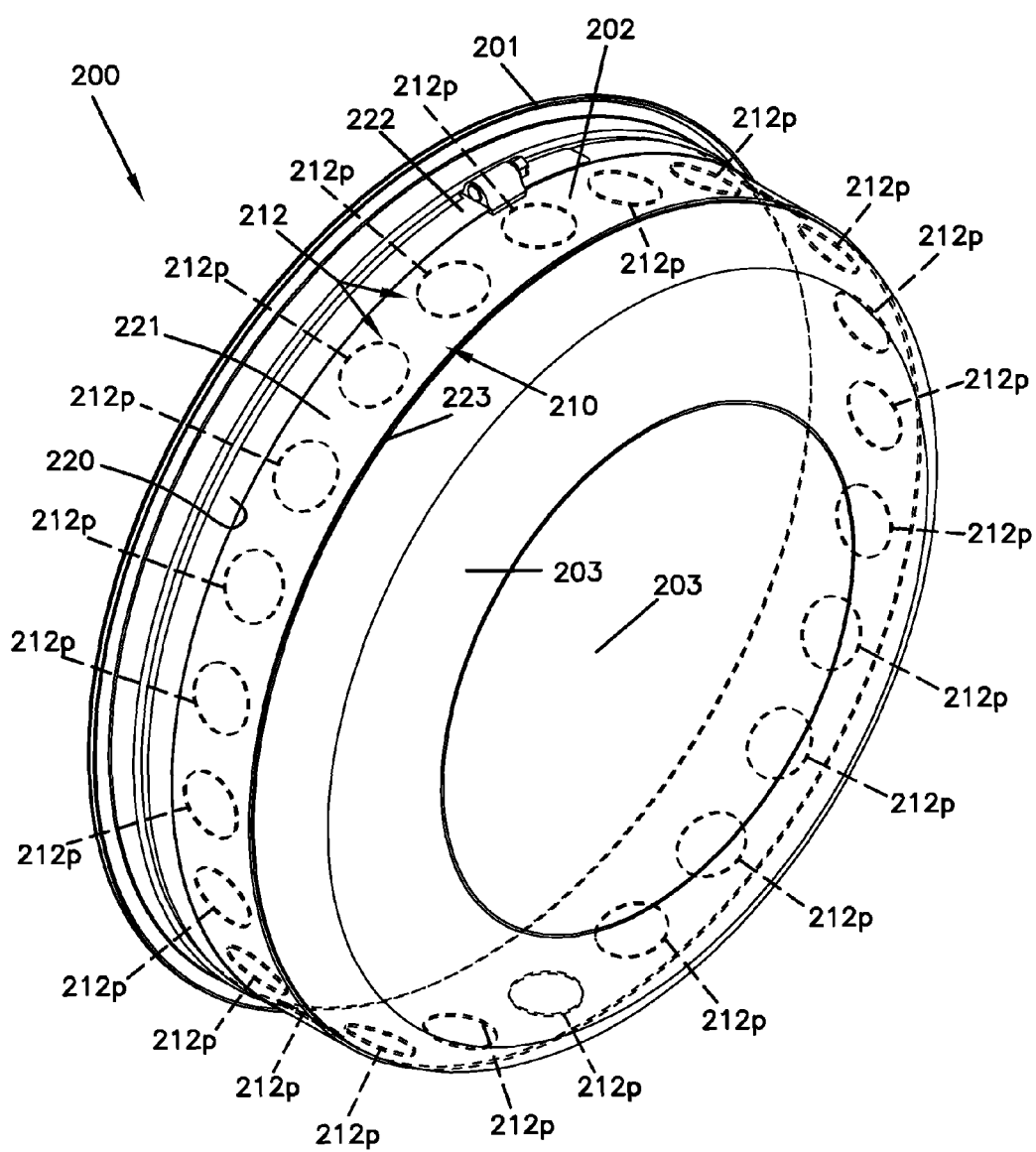
FIG. 7 is a schematic perspective view of an alternate access cover assembly including a valve arrangement according to the present disclosure.
Figure 8:
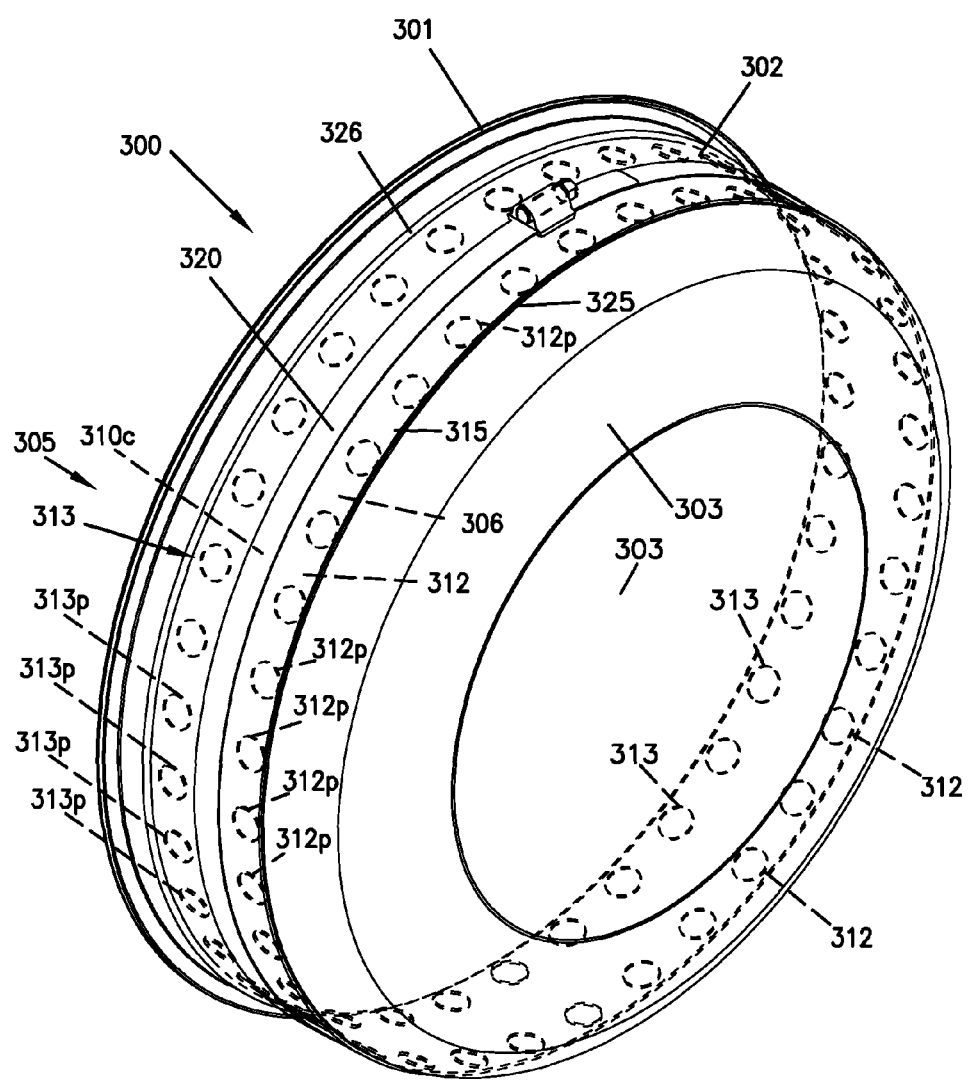
FIG. 8 is a schematic perspective view of a second alternate access cover arrangement including a valve arrangement according to the present disclosure.

Selected ones of the principles described above, can be applied in a variety of alternate applications. Examples of selected ones of these are described in this section. Selected examples are depicted in FIGS. 6-8.

As an example, the dust evacuation assembly, comprising the evacuator port arrangement and the evacuation valve arrangement, can be located at different positions in the housing, from those shown in FIGS. 1-5. As an example, the dust evacuation assembly (i.e. housing evacuation port arrangement) and the evacuation valve arrangement, can be positioned on a housing access cover, when the access cover is appropriately configured.

Figure 6:
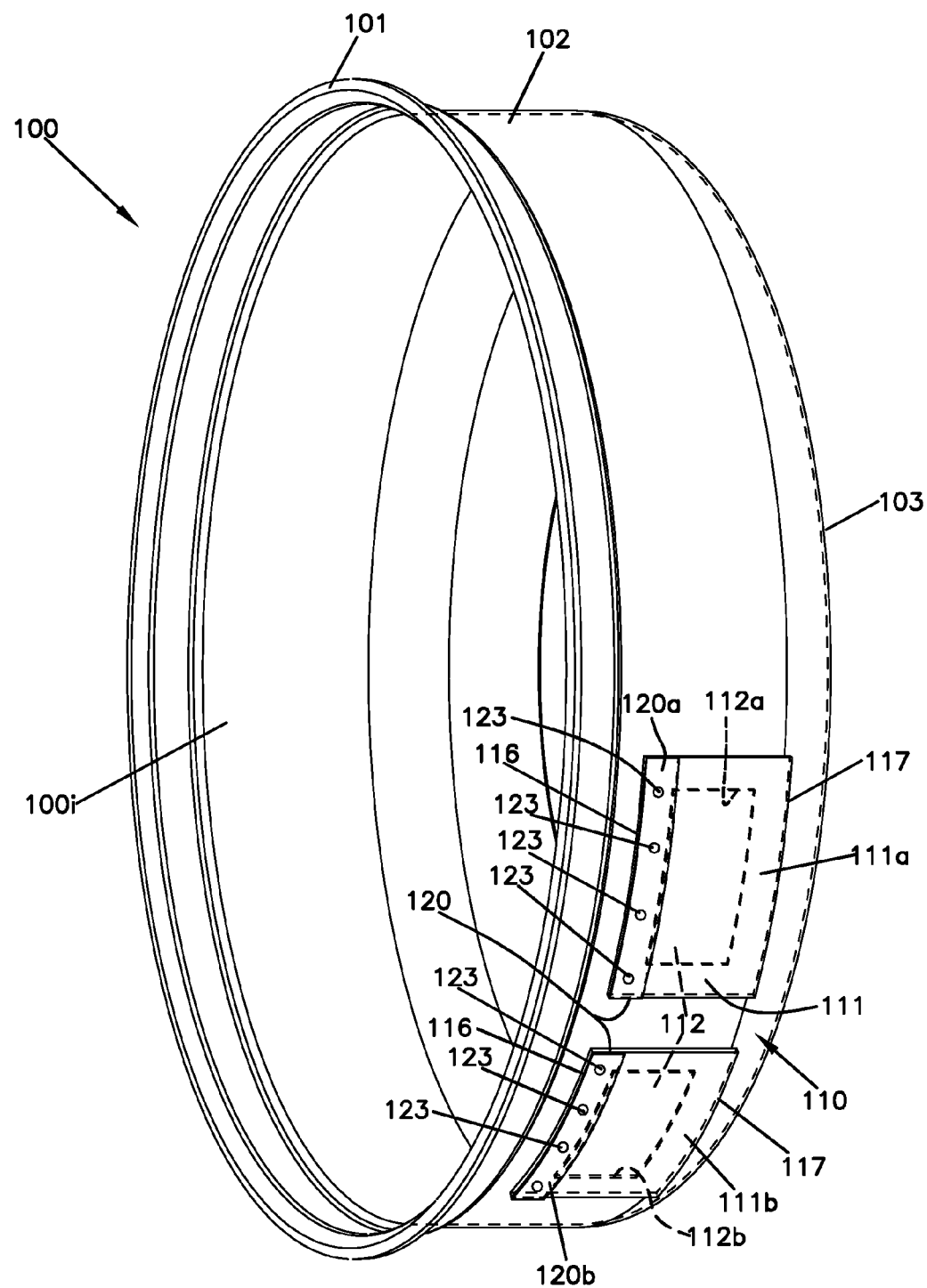
FIG. 6 is schematic perspective view of an end cover assembly including a valve arrangement in accord with the present disclosure.

Referring to FIG. 6, a housing access cover 100 is depicted. The housing access cover 100 can be mounted on an open end of a housing body, by a example arrangement analogous to mounting band 5 in bolt 5a. Referring to FIG. 6, access cover 100 includes a mounting flange 101, a sidewall section 102, and an end wall 103. In a typical air cleaner assembly in which access cover 100 is mounted, filter cartridge (service part) may extend into interior 100i.

It is noted that when access cover 100 is to be used with a cartridge having a same length as cartridge 20, FIG. 3, the housing body 2a would be shortened somewhat at open end 3, so that sidewall 102 of access cover 100 can extend around a portion of cartridge 20, and the closed end of cartridge 20 can press against end 103 of access cover 100 for stability.

Referring to FIG. 6, dust evacuation valve assembly 110 is depicted comprising a valve member arrangement 111 positioned over an evacuation port arrangement 112. The dust evacuation port arrangement 112, for the example depicted in FIG. 6, comprises first and second ports 112a, 112b.

The evacuation valve arrangement 111, for the particular example access cover 100 depicted in FIG. 6, comprises a first valve member or section 111a and a second valve or member 111b, although a single valve member could be used. Each of the valve members 111a, 111b has opposite edges, shown at 116, 117. One of the edges in this instance, edge 116, of each valve member 111a, 111b, is secured in place by holder arrangement 120 comprising sections 120a, 120b; each section 120a, 120b being secured in place by fasteners 123.

The valve member 111, comprising sections 111a, 111b, has an inner, concave, arcuate, surface against the housing sidewall, in this instance sidewall 102 of access cover 100. It is noted that the unfastened edge 117 of the valve member arrangement 111, for the example depicted, is an edge directed away from a housing body (2a), when access cover 100 installed.

It can be seen that in general terms, the arrangement of FIG. 6 is analogous to the arrangement in FIGS. 1-5. That is, the result of using the access cover 100 would be a pulse jet air cleaner assembly including an air cleaner housing having a sidewall (102) with a dust ejector port arrangement (112) therethrough. The evacuator valve assembly 110 is provided with valve member 111 with opposite edges and a valve member holder 112. The valve member 111 is secured in place over the dust ejector port arrangement 112 and held flush against an outer surface 102 of the air cleaner housing sidewall, by the valve member holder 120. The valve member holder 120 engages the valve member 111 along the first edge 116, leaving a second edge 117 free to bias outwardly to open the evacuator valve assembly under internal pressure.

Referring to FIG. 6, it is noted that typically the preferred orientation for mounting the access cover 100 is with the dust ejector port 112 directly generally downwardly.

In some instances it may not be desirable for a service provider to be required to orient the access cover in a particular rotational orientation, when mounted on a remainder of an air cleaner assembly, when the access cover includes the evacuation valve arrangement thereon. A modification to accommodate this is depicted in FIG. 7.

Referring to FIG. 7, an access cover 200 is schematically depicted comprising mounting flange or edge 201; sidewall 202; and, closed end 203. Sidewall 202 includes a dust evacuator valve arrangement 210 thereon, comprising a dust evacuation port arrangement 212. The port arrangement 212 includes a plurality of spaced ports 212p. It can be seen that no matter how the access cover 200 is rotationally positioned, when mounted on a housing body, at least a selected one of the ports 212p will be directed generally downwardly, since the ports 212p are spaced radially around the entire circumference of the sidewall 202. Typically, for this, evacuation port arrangement 212 will include at least 10 ports, usually at least 15 ports; and, often, 18 or more ports.

The evacuation assembly 210 includes a valve arrangement 220, comprising a sleeve member 221 secured in place by holding band or holder 222, providing a free edge 223 or valve member 221, for valve operation.

The assembly in FIG. 7 is generally analogous to that of FIGS. 1-5, except for the use of a plurality of ports 212p spaced radially in extension completely around circumference 202. Again, an advantage provided by this, with respect to inclusion of the dust evacuation assembly on the access cover 200, is that selected dust ejector ports 212p will be directed generally downwardly, no matter how access cover 200 is radially oriented, when mounted on a housing body, assuming the housing body is positioned generally with a central access thereof extending approximately horizontally.

As characterized above, it is again noted that there is no specific requirement that the holder arrangement be positioned along one edge of an evacuation valve member, to accommodate desirable results according to the present disclosure. An example of this is depicted in connection with FIG. 8 at 300. Here, an access cover 300 is depicted with: a mounting flange or edge 301; side 302; and, closed end wall 303. A dust evacuation assembly 305 is provided comprising a valve member 306 and evacuation port arrangement 310. The evacuation port arrangement 310, for the example depicted, includes a first port arrangement side 312 and a second port arrangement side 313. Valve member 310 comprises a sleeve 315 mounted in extension around sidewall 302 over both port arrangement sides 312, 313. The valve member 310 is secured in place by a holder 320 extending over a central location 310c of the valve member 310. The valve member 310, at each of the opposite edges 325, 326, of the valve member 310, is available to flex outwardly. Edge 325 is generally positioned to flex outwardly to allow dust eject from port arrangement side 312; and, edge 326 is generally positioned to flex outwardly from dust ejection from port arrangement side 313.

For the particular assembly 300 depicted, port arrangement side 312, comprises a plurality of spaced ports 312p positioned in extension circumferentially entirely around sidewall 302; and, port arrangement side 313 similarly comprises a plurality of spaced ports 313p also spaced from one another in extension completely around side wall 302. Thus, no matter how the access cover 300 is rotationally oriented, when mounted on a housing body, selected ones of the ports 312p, 313p, will be directed downwardly.

It is noted that the principles described herein in connection with evacuator valve assemblies on a portion of a housing side wall comprising an access cover, can be applied in a portion of the housing comprising a housing body.

III. Additional Variations and Possible Features

FIGS. 9-17

A. Variations in the Tank and Pulse Jet Valve Assemblies

It is noted that techniques generally described herein, can be applied in wide variety of pulse jet air cleaner assemblies. These assemblies can include housings that do not have compressed gas tanks mounted therein, but rather comprise housings that are provided with a pulse jet of air for cleaning from a remotely located compressed air (gas) tank. Further the valve assemblies for operating the pulse jet air flow, can be located remote from the air cleaner housing itself. Also a variety of pulse jet outlet tubes, for directing a pulse jet through an internally received filter cartridge, can be used.

Generally, then, when the term "pulse jet air cleaner assembly" and variants thereof is used herein, the reference can be to a self-contained unit (housing including cartridge, compressed gas tank and control valves that are mounted on the air cleaner housing). However, the term also includes within its scope a housing and remotely positioned equipment from the housing, such as a remote pressurized gas tank; and/or, remote control valves and/or pulse outlets.

B. An Evacuator Valve Assembly Including a Flexible Valve Member Circumscribing an Access Cover, FIG. 9.

Figure 9:
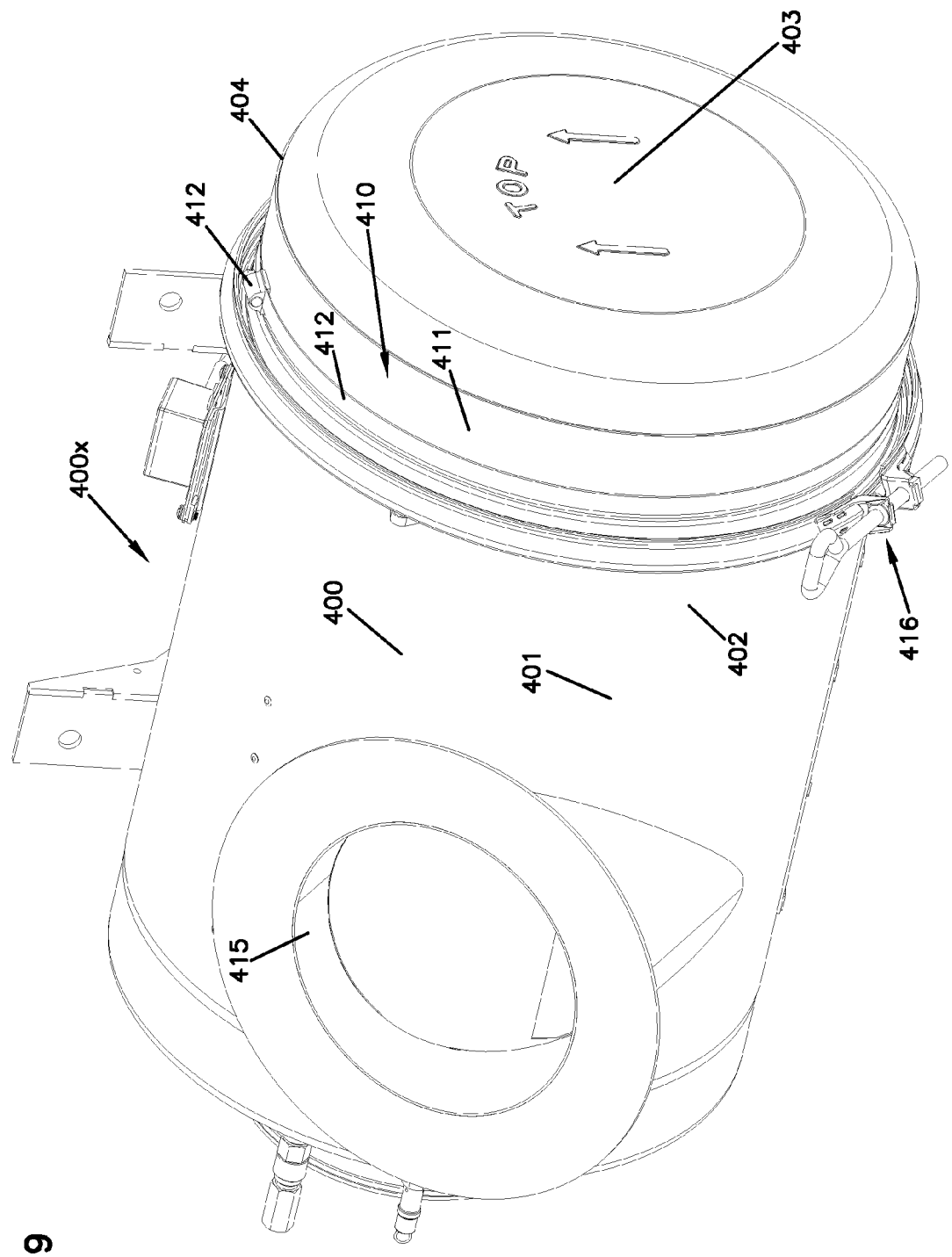
FIG. 9 is a schematic perspective view of an alternate air cleaner assembly including a valve arrangement according to the present disclosure.

Attention is now directed to FIG. 9. In FIG. 9, an air cleaner housing 400 usable in a pulse jet air cleaner assembly 400x having features in general in accord with the present disclosure, is depicted. The housing 400 comprises a side wall 401 having an end 402 closed by an access cover 403. The access cover 403 includes a sidewall or periphery (perimeter) 404 having an evacuator valve assembly 410 comprising a sleeve vac valve 411 secured in place by a clamp arrangement 412. The sleeve vac valve 410 would, for example, be positioned over an aperture or evacuator port arrangement in the sidewall or perimeter 404 appropriate for dust evacuation. The aperture arrangement could, for example, comprise a evacuator port arrangement analogous to those depicted in FIG. 6 or 7, although other alternatives are possible.

Still referring to housing 400, air cleaner assembly FIG. 9 would typically include, installed therein, a filter cartridge as previously described. The assembly 400x includes an airflow inlet 415. The airflow inlet 415 allows air to be filtered to pass into the housing 400. An inlet valve assembly could be positioned inside of housing 400, adjacent inlet 415 to inhibit the pulse jet operation from directing dust out the inlet 415, when operated. Again, such valves are described, for example, in WO 2007/149388, published Dec. 22, 2007 incorporated herein by reference; see for example FIG. 11A and related discussion therein.

Still referring to FIG. 9, clamp assembly 416 is positioned to removably secure access cover 403 in position.

It is noted that the housing 400 can be configured to include a compressed air tank or charge tank portion therein, if desired. On the other hand a compressed air tank for use with the housing 400 can be positioned remotely if desired. As indicated above, the same is true for valve members, for controlling pulse jet operation.

Figure 10:
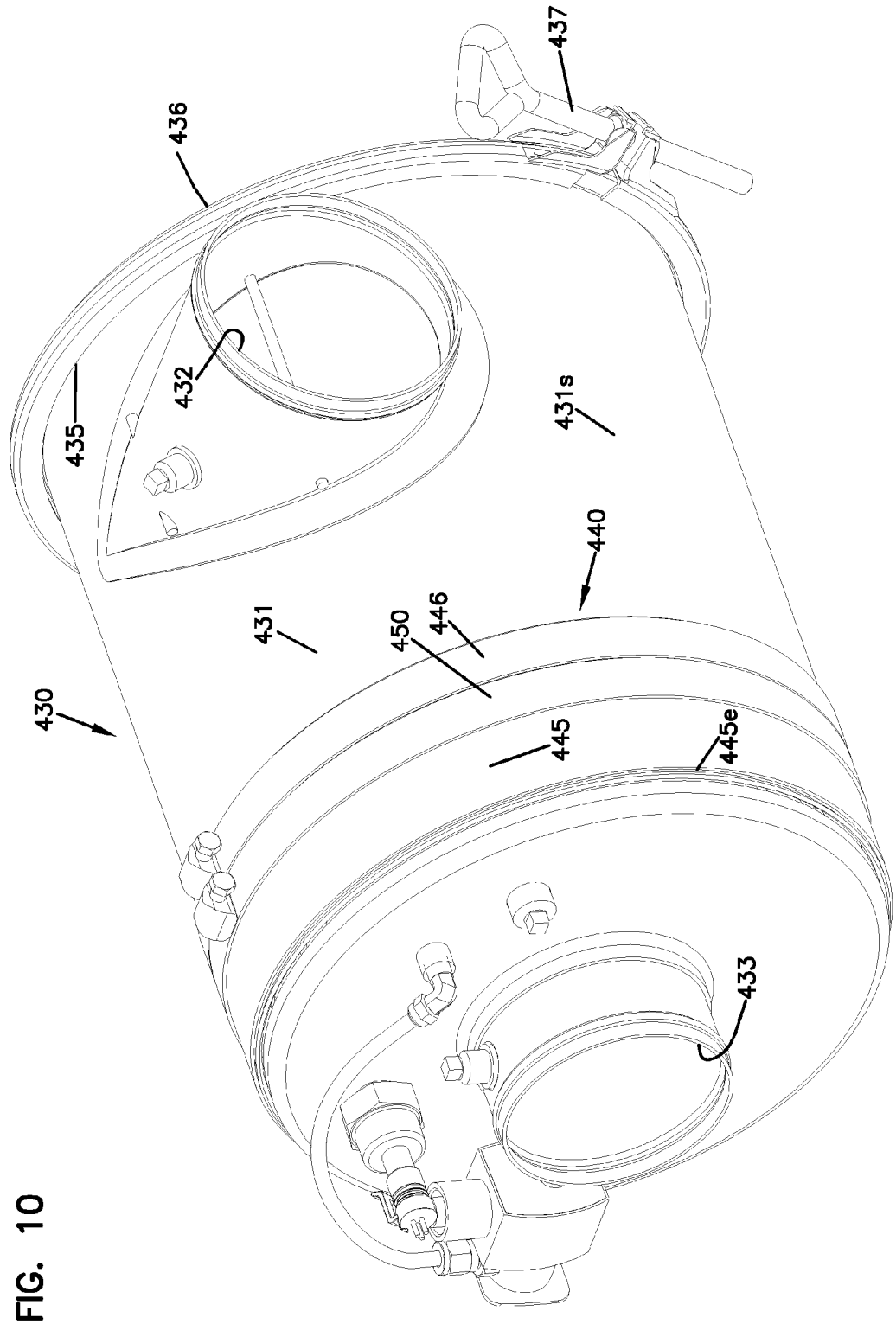
FIG. 10 is a schematic perspective view of an air cleaner assembly generally analogous to FIG. 5, depicting two clamps, of the valve arrangement, positioned for normal operation.
Figure 11:
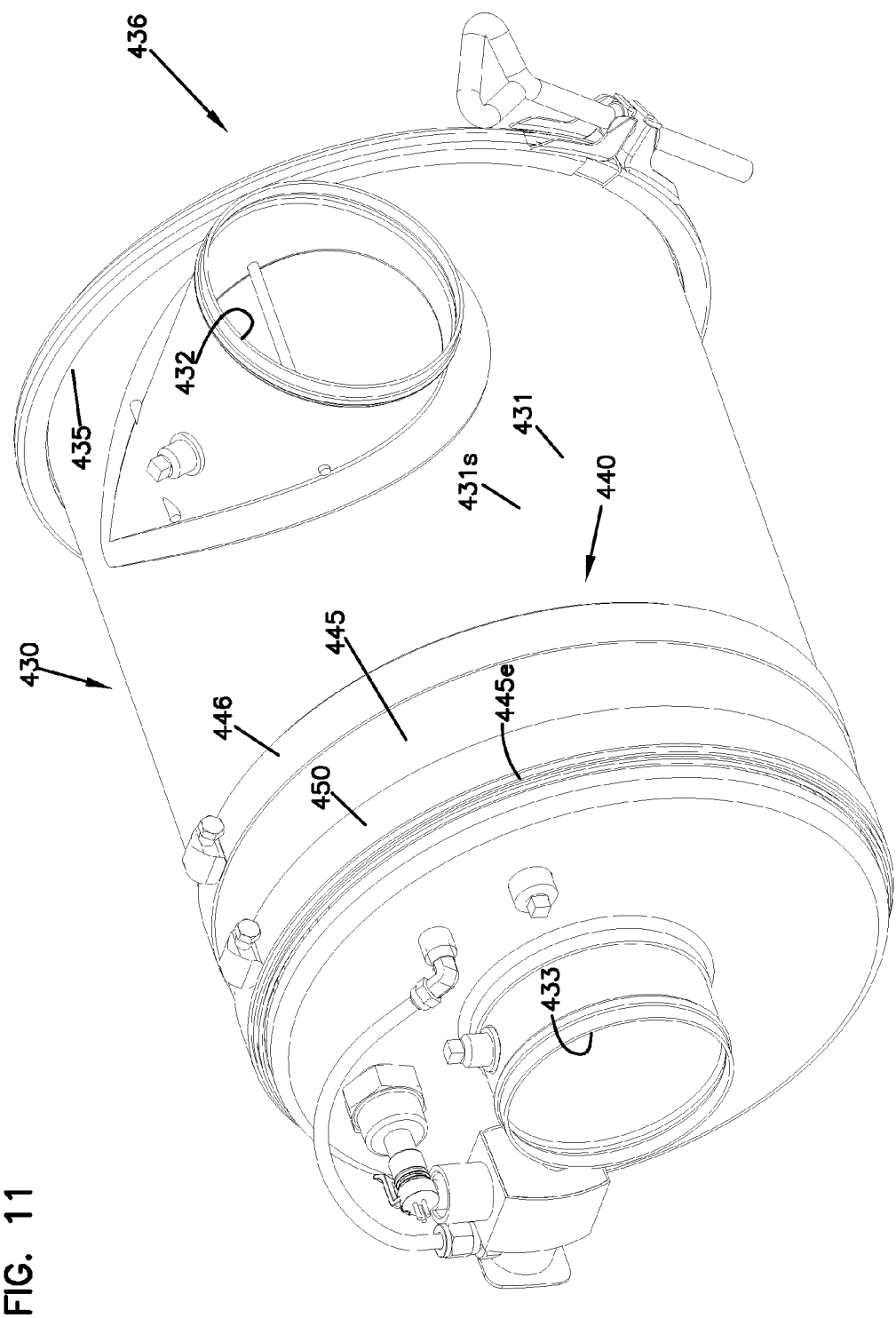
FIG. 11 is a schematic perspective view of the assembly of FIG. 10, depicting the two clamps positioned for a water fording operation.

C. Example Use of Two Hoop Clamps; FIGS. 10 and 11

Attention is now directed to FIG. 10. In FIG. 10, a pulse jet air cleaner assembly 430 is depicted, having features generally analogous to assembly 1, FIG. 1. Thus, the assembly includes a housing 431 having an air flow inlet 432 and an air flow outlet 433. Housing 431 includes a sidewall with an end 435 enclosed by an access cover 436 secured in place by clamp 437. Assembly 430 includes an evacuator valve arrangement 440 comprising a sleeve outlet member 445 secured in place by clamp 446 on a portion of housing sidewall 431s.

As thus far characterized, the assembly 430 is generally analogous to assembly 1, FIG. 1. Assembly 430 is configured for operation, but also to be ready for adjustment for a water fording operation by the presence of second clamp 450. The second clamp 450 is depicted, in FIG. 10, as positioned in place so as not to interfere with the opening of the sleeve vac valve 445 along edge 445e. Rather, clamp 450 is secured on assembly 430, in a position extending around a portion of housing 431, i.e. on sidewall 431s, so that it can be loosened and then moved to a position for a water fording operation generally analogous to the depiction in FIG. 5.

With respect to this, attention is directed to FIG. 11. Here clamp 450 has been moved to adjacent previously free edge 445e, to completely close sleeve valve member 450 for water fording operation, generally analogous to FIG. 5.

D. An Additional Location for an Evacuator Valve Assembly; Alternate Configurations; Possible Use in a Retrofit Process; FIGS. 12-17.

Figure 12:
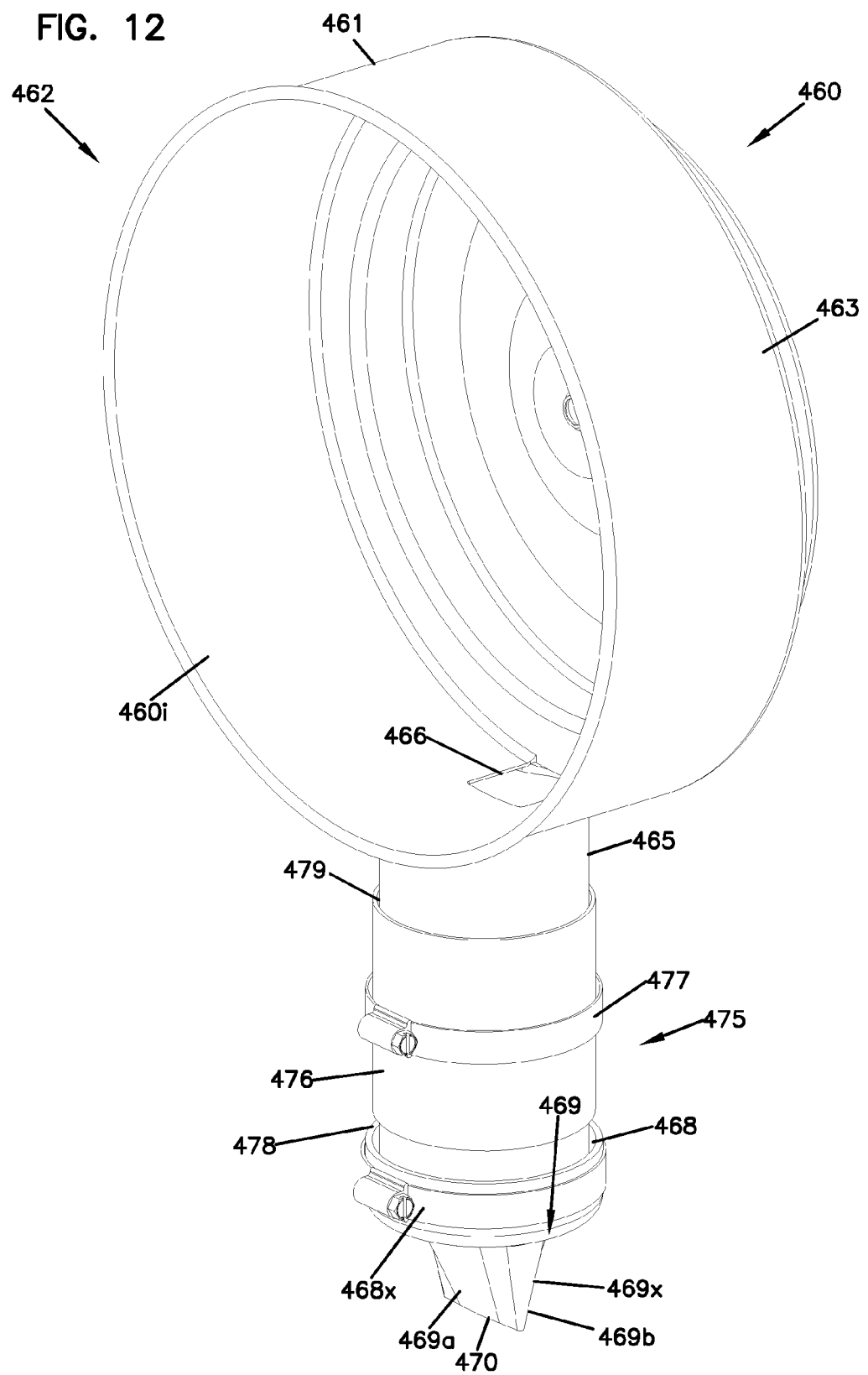
FIG. 12 is a schematic perspective view of a portion of an air cleaner assembly housing having a dust drop tube with an evacuation valve arrangement according to the present disclosure thereon.

Referring first to FIG. 12, a portion 460 of a housing 461 for pulse jet air cleaner assembly 462 is depicted. The particular portion 460 depicted is an access cover 463. However, principles described herein with respect to the evacuator valve assembly, can be applied when the portion 460 comprises another portion of a housing body, for example a sidewall portion analogous to portion 401, FIG. 9, which surrounds a space into which a cartridge is installed, in use.

Still referring to FIG. 12, the portion 460 of the housing 451 depicted, includes a drop tube 465 thereon. The drop tube 465 is positioned in communication with interior 460i of housing portion 460 through dust/water exit aperture 466.

The drop tube 465, and evacuation aperture 466 are generally oriented to be directed downwardly, when the air cleaner assembly 462 is mounted for use. Water and/or dust pass through aperture 466 into tube 465, for evacuation from interior 460i.

Referring to FIG. 12, the drop tube 465 includes an open, bottom, exit end 468 over which is mounted an evacuator valve 469, in the example depicted a "duck billed" type evacuator valve 469x. The evacuator valve 469x includes a bottom end slit 470 which can be forced open, under water and/or air pressure within tube 465, for passage of material outwardly therefrom. Such evacuator valve arrangements are known. In general, such an arrangement comprises a slit opening in a tip of a flexible cover or rubber like member. In the air cleaners under normal operation, the suction draw tends to pull the two opposite sides or bills 469a, 469b together, closing the slit. When suction draw is turned off, for example when the unit is shut-off, a dust head or water head in the drop tube 465 will tend to push the material out of the slit 470.

Of course, if a pulse jet is operated, dust and/or water would be pushed out the slit 470 also. However, the slit opening for such a system, is typically no more than about 0.8 sq. in. (5.16 sq. cm), when wide open. This is generally too small an aperture, to accommodate a pulse jet operation. That is, typical duck billed type evacuator valves and related evacuator valves, provide for too small of a dust exit aperture size, to be used with a pulse jet system as the only means for dust escape.

Still referring to FIG. 12, to accommodate a pulse jet operation, the dust drop tube 465 has been modified to further includes thereon, a pulse evacuator valve arrangement 475 comprising a sleeve member 476 secured in place by a hoop clamp 477 generally in accord with principles described herein above. Thus, the sleeve member 476 is a flexible member that extends around a portion (or sidewall portion) of a housing, in this instance a dust drop tube sidewall portion 465, and which is secured in place by hoop clamp 477 with at least one edge 478 left free. For the particular example depicted in FIG. 12, each of opposite edges 478, 479 is free, and thus can flex outwardly away from tube 455. It will be understood that underneath sleeve 476, tube 465 would include appropriate aperture arrangement (dust evacuation port arrangement) therein for evacuation of a pulse jet therethrough.

Thus, the example assembly of FIG. 12 includes: the original evacuator valve or duck billed valve 469; and, also an evacuator valve arrangement comprising a sleeve valve 476, in accord with the general descriptions herein. It is noted that in FIG. 12, an extra hoop clamp 468x is shown holding the duck billed evacuator valve 468 in place. This is because an ordinary duck billed valve, under a pulse jet operation, has such a small open area that it may be blown off the assembly by the pulse. Of course, in some instances extra clamp 468x may not be necessary, for example, if an adhesive is used to secure valve 468 in place, or if the opening for vac valve arrangement 475 is sufficiently large so that substantial pulse does not reach valve 468.

Figure 13:
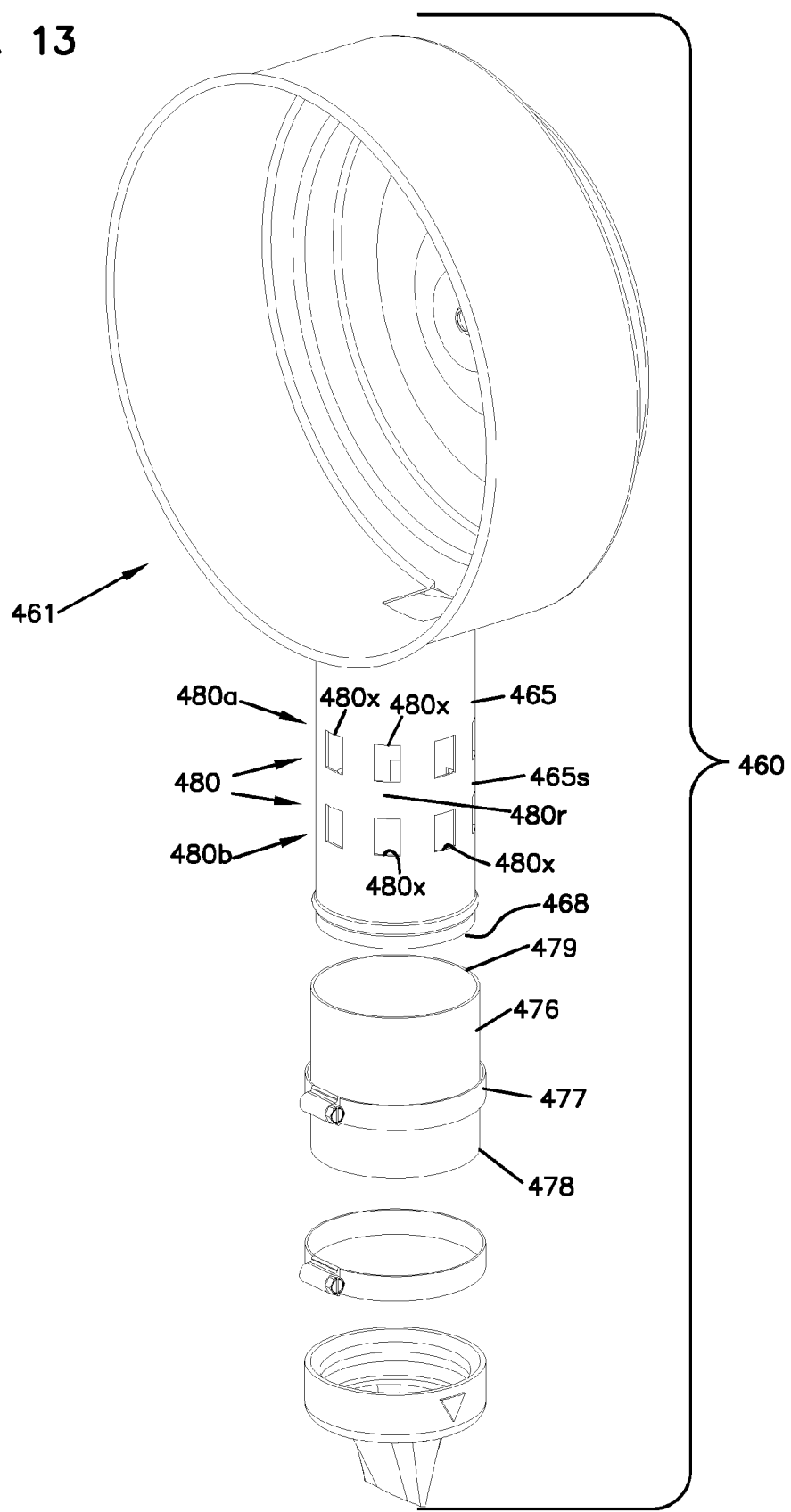
FIG. 13 is an exploded perspective view of the air cleaner componentry of FIG. 12.

Attention is now directed to FIG. 13. FIG. 13 is an exploded perspective of a housing portion 460. Here dust drop tube 465 can be seen as having an outer sidewall 465s with an aperture arrangement (dust evacuation port arrangement) 480 therethrough, comprising first row 480a and second row 480b of apertures or ports 480x. The rows 480a, 480b are separated by a region 480r around which clamp 477 will be positioned, when installed.

Referring to FIG. 13, it is noted that dust evacuation port arrangement 480 in a sidewall 465s of drop tube 465 (alternately stated in a sidewall portion of housing 461) can comprise a port arrangement retro-fit into a previously existing drop tube, that was previously only open at end 468, in order to accommodate such retro-fit to include a pulse jet arrangement in accord with the principles described herein. That is, a previously existing air cleaner assembly can be converted to a pulse jet assembly, in part by providing appropriate location for dust ejection under a pulse jet, for example by increasing total aperture area and modifying the evacuator valve arrangement. In the example of FIG. 13, a previous system which included a drop tube with an open end cover by a duck billed valve, is modified for use with a pulse jet system by adding, in the sidewall of the drop tube (i.e. a sidewall portion of the housing) a dust evacuator port arrangement, over which is positioned a sleeve vac assembly in accord with the descriptions herein.

It can be seen then that during installation, sleeve 476 is pushed over tube 465 in a manner covering aperture arrangement (dust evacuation port arrangement) 480. The hoop clamp 477 is positioned so as to secure the sleeve 476 in place, without inhibiting movement of the sleeve vac valve 476 during pulse jet operation, to allow for evacuation through apertures 490. For the particular example arrangement of FIG. 13, the hoop clamp 477 would be aligned with region 480r allowing each of the ends 478, 479 to be free, to flex open, allowing for evacuation of a pulse jet through each of rows 480a, 480b of apertures 480x. Of course, the assembly could be alternately configured, so that only one of the edges 478, 479 is free. When this is the case, typically it will be selected to be downwardly facing edge 478, although alternatives are possible.

Again, from the descriptions associated with FIGS. 12 and 13, in general an opportunity for retro-fit of an air cleaner will be understood. In general, an air cleaner can be provided with a dust drop tube or other sidewall portion, which air cleaner is not a pulse jet air cleaner. The dust drop tube or other sidewall portion can be modified to include an aperture arrangement such as aperture (or port) arrangement 480 therein, in a sidewall of the dust drop tube or other housing portion, and valve member can be positioned over the aperture (or ports). Thus, a prior art non-pulse jet air cleaner style housing, can be modified for use a pulse jet air cleaner, by adding the evacuation apertures, and a vac valve, for example in a side of a drop tube.

It will be understood that this retro-fit can be conducted whether the drop tube 465 is positioned on an access cover or an alternate portion of the air cleaner housing. Of course, the retro-fit could involve positioning apertures in other portions of the housing, besides the drop tube.

It is noted that aperture arrangement of the dust drop tube can vary from the depicted FIG. 13. Also, the assembly can be configured for water fording. With respect to this, attention is directed to FIGS. 14-17.

Figure 14:
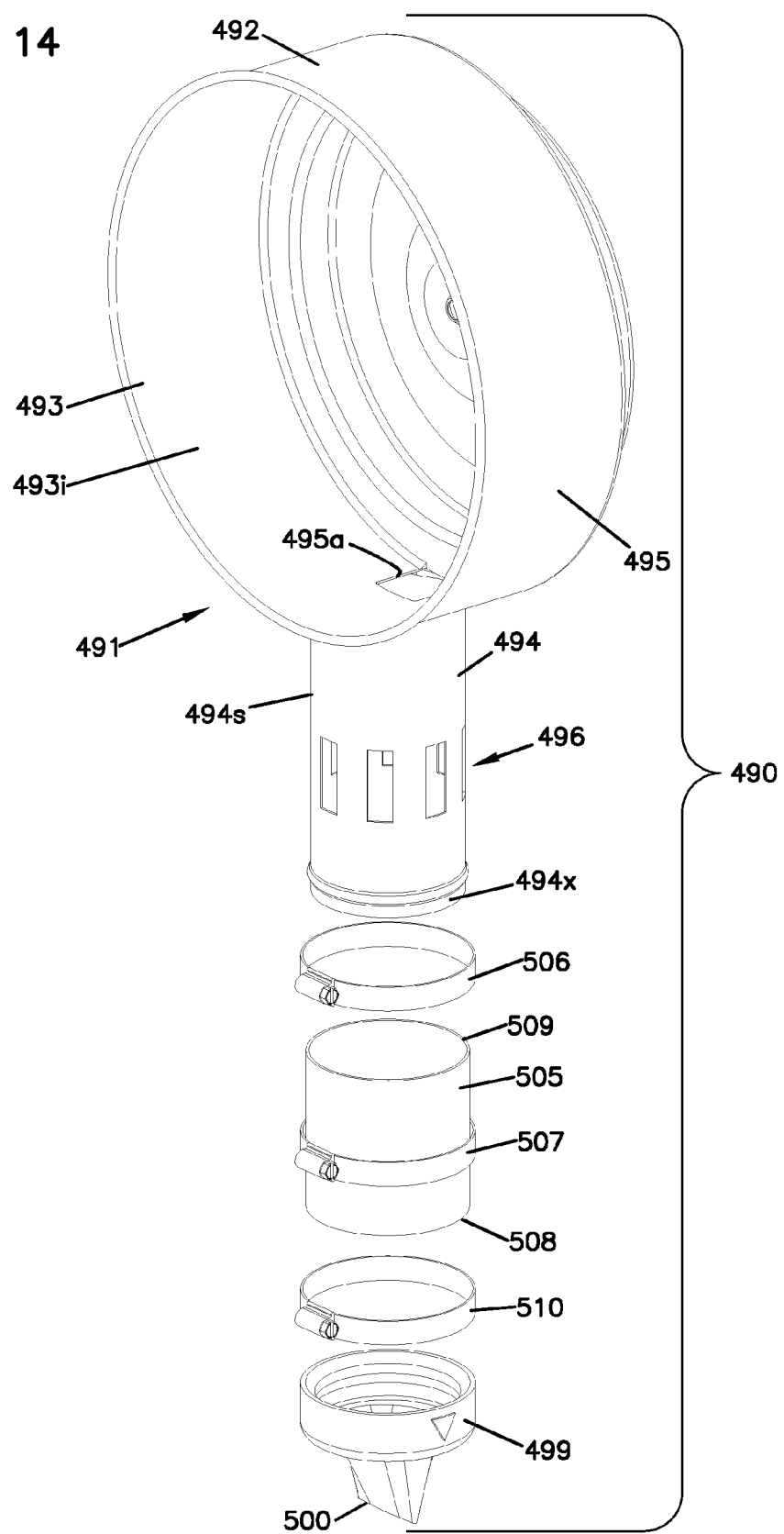
FIG. 14 is an exploded perspective view of an alternate assembly with a dust drop tube thereon.

Referring to FIG. 14, an exploded perspective view is depicted of an assembly 490 for evacuation, in a portion 491 of a pulse jet air cleaner assembly 492. In particular, and referring to FIG. 14, the portion 491 comprises a housing portion 493 having a dust drop tube 494 thereon. The particular housing portion 493 depicted comprises an access cover 495, although analogously to the description above, the portion may comprise part of a housing body. The housing portion interior 493i, includes an aperture 495a for dust/water passage in tube 494.

Directed downwardly, in overlap with aperture 495 is provided dust drop tube 494, having an end 494x, and a sidewall 494s with an aperture arrangement (dust evacuation port arrangement) 496 therethrough. A duck billed evacuator valve 499 having end slit 500 is shown positioned in assembly 490, fit over end 494x of dust drop tube 494.

Still referring to FIG. 14, the assembly 490 further includes a sleeve member 505 configured to extend around tube 494 over aperture arrangement (dust evacuation port arrangement) 496 in a portion of the housing sidewall. Two hoop clamps 506, 507 are depicted. As will be understood from depictions of FIGS. 15 and 16, the two hoop clamps 506, 507 can be configured to provide for normal operation of the evacuation valve assembly, or for a water fording operation. A third hoop clamp 510 is shown, for duck billed valve 499.

Figure 15:
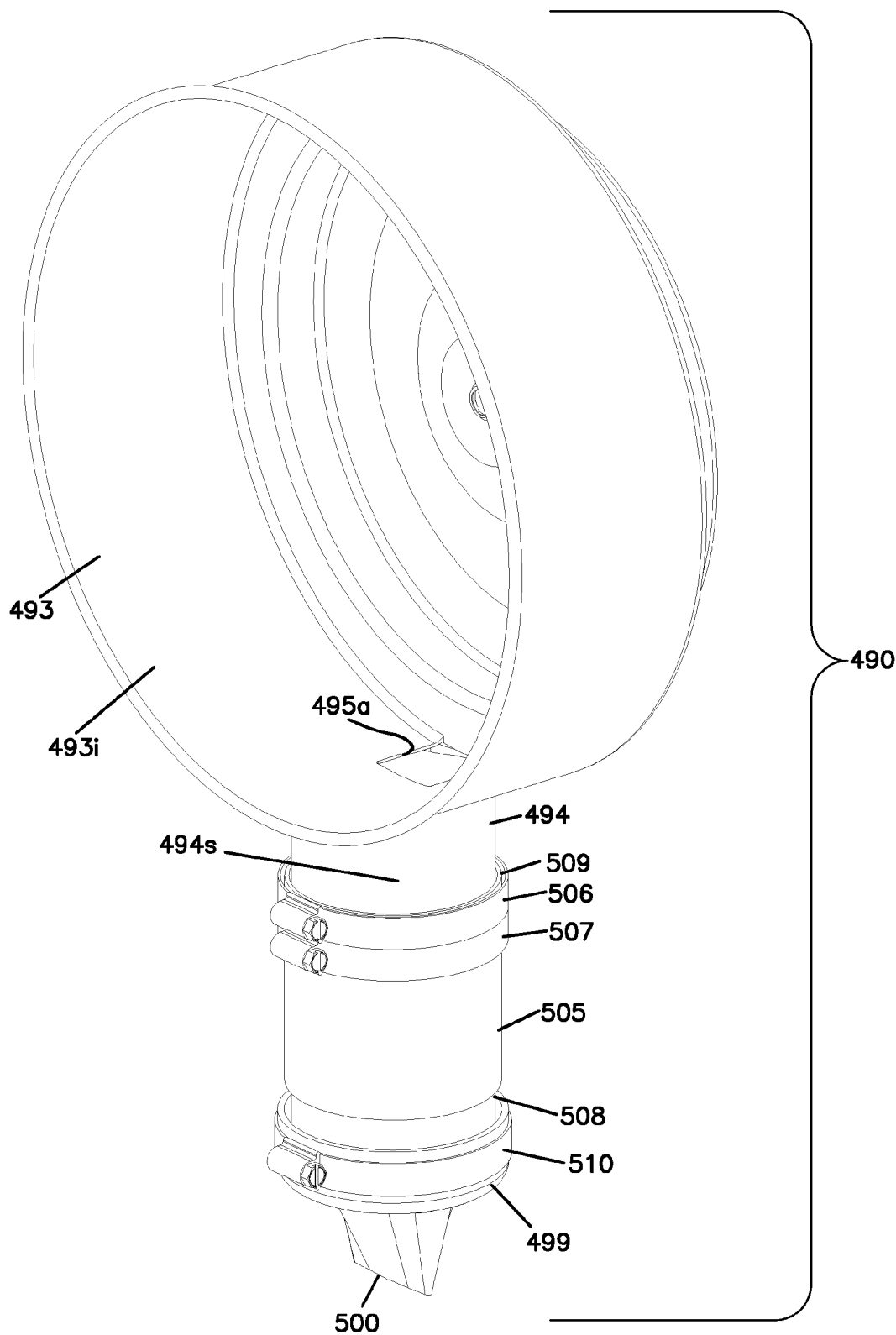
FIG. 15 is a perspective view of the componentry of FIG. 14 configured for normal operation.

Referring now to FIG. 15, the assembly 490 is depicted for normal pulse jet operation. The sleeve 505 is positioned with a lower edge 508 free. Thus, edge 508 can bias away from drop tube 494 (i.e. away from an arcuate section of the housing sidewall) under internal pulse jet bias, to allow water/dust evacuation from interior 493i. The two hoop clamps 506, 507 are shown positioned next to upper edge 509 of sleeve 505. Thus, the hoop clamps 506, 507, are positioned so as to secure the sleeve valve 505 in place, without blocking air exit from aperture arrangement 496, FIG. 14. Clamp 510 is shown securing duck billed valve 499 in place.

Figure 16:
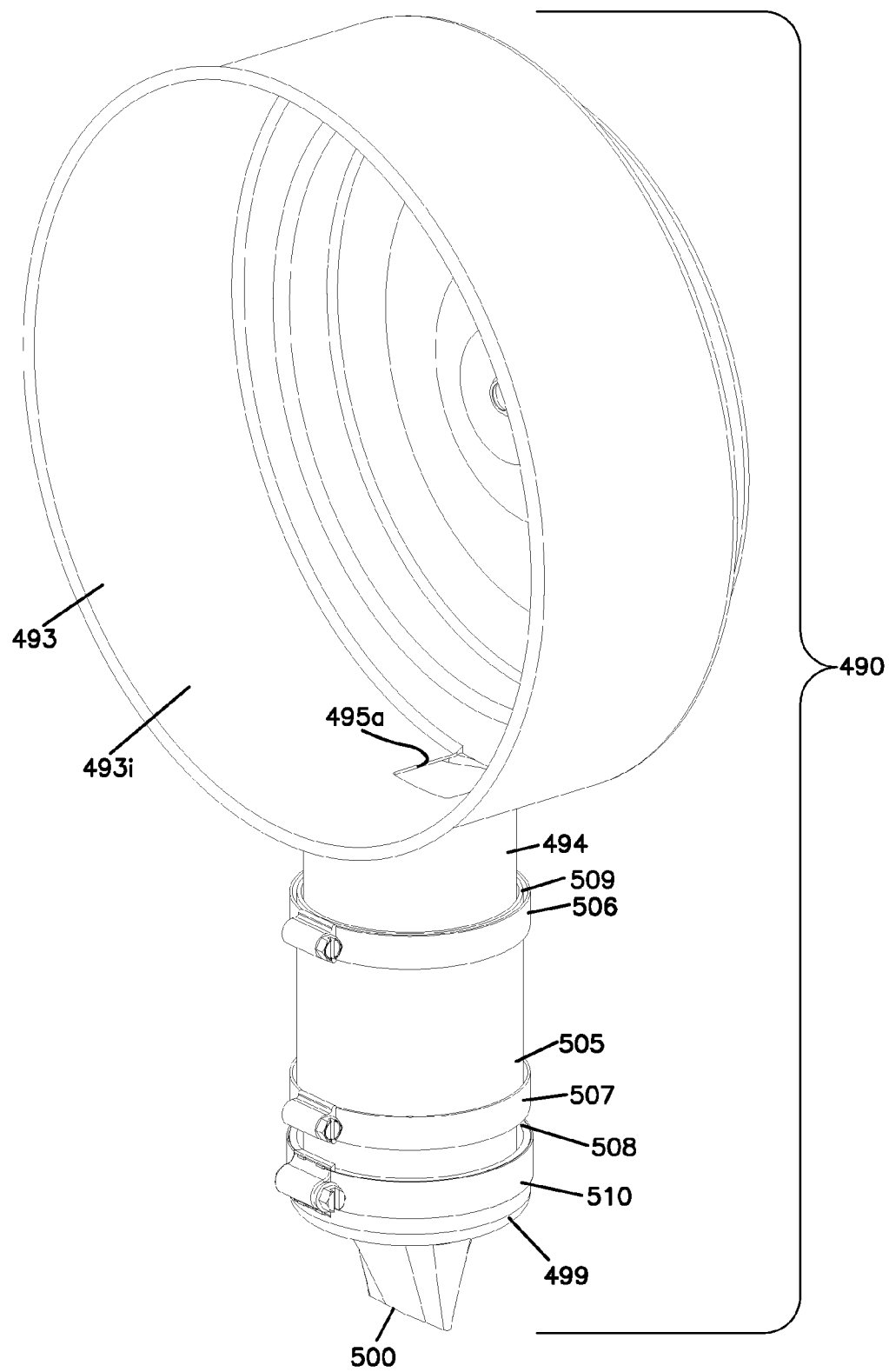
FIG. 16 is a view analogous to FIG. 15, but depicting the componentry configured for water fording operation.
Figure 17:
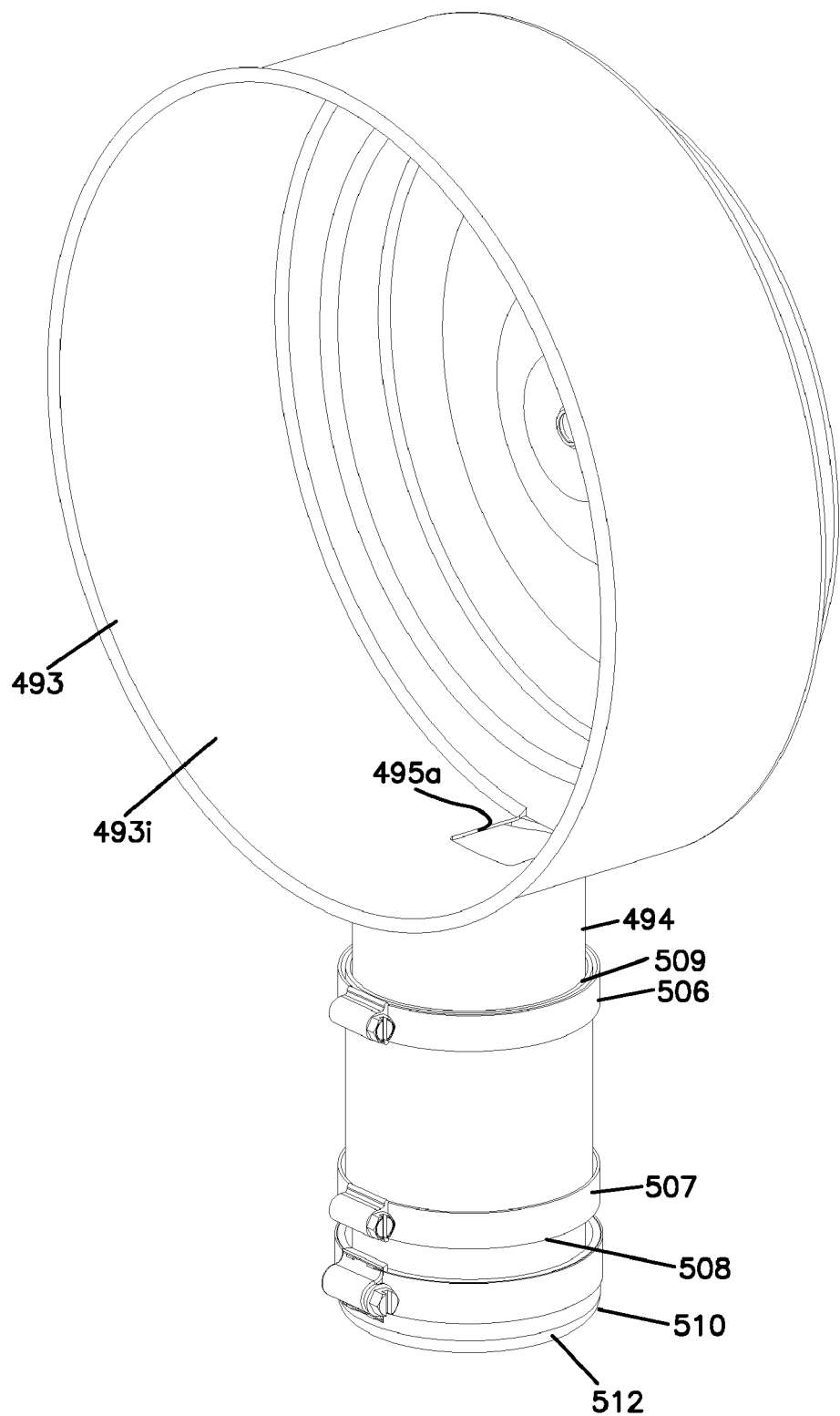
FIG. 17 is a view analogous to FIG. 16, but alternately configured for a water fording operation.

In FIG. 16, assembly 490 is depicted configured (adjusted) for a water fording operation. Here, clamp 507 has been moved to lower edge 508 of sleeve member 505, while clamp 506 is maintained adjacent edge 509. Under the configuration of FIG. 16, with a pulse jet operation, the sleeve 505 is closed, and will not bias away from drop tube 494, to open.

It is noted that in FIG. 16, slit 500 in duck billed valve 499 is not shown secured closed for water fording operation. In some instances, this may be appropriate, in use of an arrangement as depicted in FIG. 16, since the duck billed assembly 499 has some resistance to opening due to the material from which it is made, and further will tend to resist opening as a result of suction forces within the assembly during use. However, it is noted that in some water fording operations, it may be desirable to achieve greater closure than just relying on the material properties of valve 499. A number of possibilities exist, including, for example, putting an interior plug over or in tube 494, for example in aperture 495a. Alternatively, and referring to FIG. 17, the duck billed member 499 can be completely removed, and be replaced with a cap which is shown at 512, which will close the lower end of tube 494 to passage of material therefrom.

IV. Some General Comments and Observations

According to the present disclosure, a variety of specific features and techniques are described, relating to evacuator valve assemblies, construction, features and operation, in the context of pulse jet air cleaner assemblies. There is no specific requirement that all of the specific features and techniques characterized herein be used in practice, in order to obtain some benefit according to the principles of the present disclosure.

According to one aspect of the present disclosure, a pulse jet air cleaner assembly is provided. The term "pulse jet air cleaner assembly" in this context, is meant to generally refer to an air cleaner having a pulse jet system associated with it to provide selected pulsing of air or other gases through a service cartridge in a manner reverse to filtering flow.

In general, according to one characterizing aspect of this disclosure, the pulse jet air cleaner assembly includes an air cleaner housing having a sidewall or wall portion with a dust ejector port arrangement therethrough. An evacuator valve assembly is provided, including a flexible valve member having first and second, opposite, edges and a valve member holder. The valve member is operably secured in place over the dust ejector port arrangement and is held against an outer surface of the air cleaner housing sidewall or wall portion by the valve member holder. The valve member holder is positioned to engage the valve member at a location leaving at least one of the first and second opposite edges free to bias open under housing internal pressure, for example as provided by pulse jet operation. The valve member can comprise more than one piece, the port arrangement more than one port, and more than one edge of the valve member can be left free to flex outwardly. The holder can comprise more than one member.

In a specific example depicted, the air cleaner housing sidewall or wall portion includes an arcuate section through which the ejector port arrangement extends; and, the valve member has an arcuate (concave) inner surface (in installation) that engages the arcuate section of the sidewall. Herein, the term "in installation" in this context, is meant to refer to the valve member being arcuate when mounted. The valve member may be sufficiently flexible to be non-arcuate, before mounting.

It is in a typical assembly, the housing will comprise a housing body and an access cover. The dust ejector port arrangement and evacuator valve assembly can be positioned on either the housing body or the access cover, at an operable location. Examples of both are described.

It is also noted that the housing sidewall or wall portion through which the dust ejector port arrangement is provided, and over which the valve member is secured, can be a sidewall of a drop tube, for example on either the housing body which receives the cartridge during installation, or on an access cover.

In an example depicted, the air cleaner housing includes a first outer sidewall section (around the cartridge, around an access cover, or around a dust tube) having a circular perimeter, although alternate shapes are possible. Further the ejector port arrangement extends through the first outer sidewall section, and thus is often in an arcuate section configured to the radius of a circle. Further, the valve member has a side positioned against the first outer sidewall section over radial arc of at least 20°, typically at least 90°, usually at least 180° sometimes over at least 270°; and, in examples shown, over an extension, continuously, of 360°.

The valve member may comprise more than one valve section or valve member portion, if desired. In some instances the valve member can comprise a single, flexible, member.

In an example depicted, the valve member is a sleeve member that extends continuously around the housing sidewall or wall portion, whether that portion is an access cover, a receiver for a cartridge, or a drop tube. Also, in the example depicted, the valve member holder is an adjustable hoop clamp, removably mounted on the assembly. The assembly can include a location bead or projection on the housing sidewall, facilitating positioning of the valve member and/or hoop clamp.

For an example configuration, a field modification is described in which the valve member is temporarily secured closed, for example to facilitate a water fording operation. In examples described, the closure of the valve member is provided by a second removable clamp positioned over the valve member in a manner preventing the valve member from opening. Embodiments are described in which the second hoop clamp is moved from first position to facilitate pulse jet operation, to a second position for water fording operation, and thus is maintained on the assembly at all times. Alternatively the second hoop clamp can just be added during the water fording operation.

In an example arrangement depicted, the air cleaner assembly includes therein a compressed gas tank for operation to provide the pulse jet. For a particular example depicted, having a compressed gas tank therein, the gas tank is positioned in the air cleaner assembly at a location surrounded by a sidewall, and surrounding an air flow outlet arrangement or tube.

In general terms, according to the present disclosure, a method of installing an evacuator valve assembly, on an air cleaner assembly, is described. The method generally comprises: providing an air cleaner housing with an outer sidewall having a dust ejector port arrangement projecting therethrough; and, positioning on the housing an evacuator valve assembly. The outer sidewall or sidewall portion of the housing having the dust ejector port arrangement projecting therethrough, can comprise for example: a portion of the housing surrounding the cartridge when installed; an access cover; or, a dust drop tube. The evacuator valve assembly generally comprises a valve member, and can be a sleeve member extending completely around the sidewall or sidewall portion and in a covering arrangement with a dust ejector port arrangement. In examples described, a hoop clamp is provided surrounding the sleeve member and securing the valve member in place. In examples depicted, the hoop clamp is positioned adjacent an edge of the sleeve member, leaving an opposite edge free to bias open during opening of the valve assembly. In other examples, the hoop clamp is in a position to leave both of first and second, opposite, edges of the sleeve member free to bias.

Herein, examples of retro-fitting an air cleaner for pulse jet operation are described. The example techniques generally comprise providing in a portion of the sidewall of the housing, dust ejector port arrangement, preferably having an open area of at least 1 sq. cm (6.45 sq. cm) typically at least 2 sq. cm (12.9 sq. cm) and, sometimes substantially more. This evacuator port arrangement can be provided in a portion of a sidewall of a housing section that receives a cartridge during installation, in an access cover, or in a dust drop tube, for example. Wherever located, this evacuator port arrangement is then covered with a valve assembly, typically the valve assembly as characterized herein. In some instances, the retro-fit air cleaner may include a previous dust evacuator valve assembly thereon, for example a duck billed valve assembly, which was appropriate prior to modification of dust ejector operation, and which may be retained if desired.

In an example depicted, the air cleaner housing includes a housing body with an end closed by an access or service cover, and the valve member is positioned with the first edge secured (by a holder member) generally directed toward the access cover, and with a second (free) edge directed away from the access cover. In an example arrangement depicted, the air cleaner housing includes a drop tube and evacuator valve assembly includes apertures in the sidewall of the drop tube that are covered by a valve member, for example a sleeve member. The drop tube may include an open end with another evacuator valve member, for example a duck billed valve member, thereover.

In general terms, according to the present disclosure, a method of installing the evacuator valve assembly, on an air cleaner assembly, is described. The method generally comprises: providing an air cleaner housing with an outer sidewall or sidewall portion having a dust ejector port arrangement projecting therethrough; and, positioning on the housing an evacuator valve assembly. The evacuator valve assembly generally comprises a valve member, and can be a sleeve member extending completely around the sidewall and in a covering arrangement with a dust ejector port arrangement. In an example described, a hoop clamp is provided surrounding the sleeve member and securing the valve member in place. In an example depicted, the hoop clamp is positioned adjacent an edge of the sleeve member, leaving an opposite edge free to bias open during opening of the valve assembly. In another example, the hoop clamp is in a position to leave both of first and second, opposite, edges of the sleeve member free to bias.

In general, with this method, the sidewall or sidewall portion having a dust ejector port arrangement therethrough can comprise: portion of sidewall which surrounds the filter cartridge when installed; a portion of an access cover; or, a dust drop tube.

In an alternate characterization, an example air cleaner assembly according to the present disclosure is provided having a housing with an outer wall or wall portion having a dust ejector port arrangement therethrough. An evacuator valve assembly, comprising a flexible sleeve valve member extending completely around the outer sidewall in valve closing relation and the dust ejector port arrangement, is provided. By "valve closing relation" in this context, it is meant that the sleeve member is positioned to close the dust ejector port arrangement; the sleeve member being a valve member which can periodically open. The portion of the housing around which the sleeve member extends can, for example, be a housing body section that surrounds a cartridge when installed; an access cover; or, a drop tube; and, the arrangement may include selected features as previously described.

Also in general terms, a method of installing a evacuator valve assembly on an air cleaner housing with a dust drop tube is described. The method generally includes providing apertures in a sidewall of the dust drop tube, and positioning an evacuator valve member over those apertures in the sidewall of the drop tube, the sleeve vac valve being used as an example. The method can be practiced with a evacuator valve already over the end of the drop tube, for example a duck billed type evacuator valve, being retained present, or being removed and replaced by an end cover.

As previously indicated, there is no specific requirement that an assembly include all of the features characterized herein, in order to obtain benefit according to the present disclosure. Further, as is characterized herein, techniques do not need to be practiced with all of the structural operational detail described, to obtain some benefit.

What is claimed is:

1. A pulse jet air cleaner assembly comprising:
   (a) an air cleaner housing having a sidewall with a dust ejector port arrangement therethrough;
      (i) the air cleaner housing sidewall including an arcuate section through which the ejector port arrangement extends; and,
   (b) an evacuator valve assembly including a flexible valve member having first and second, opposite, edges; and, a valve member holder;
      (i) the valve member being operably secured in place over the dust ejector port arrangement and held flush against an outer surface of the air cleaner housing sidewall by the valve member holder;
      (ii) the valve member holder engaging the valve member, leaving at least one of the first and second, opposite, edges free to bias outwardly to open the evacuator valve assembly under housing internal pressure; and,
      (iii) the valve member having an arcuate inner surface, in installation, that extends over the arcuate section of the sidewall.

2. A pulse jet air cleaner assembly according to claim 1 wherein:
   (a) the air cleaner housing includes a first outer sidewall section having a circular perimeter;
      (i) the ejector port arrangement being in the first outer sidewall section; and
   (b) the valve member is positioned against the first outer sidewall section and extends over a radial arc of at least 20°.

3. A pulse jet air cleaner assembly according to the claim 2 wherein:
   (a) the valve member extends over a radial arc of at least 180°.

4. A pulse jet air cleaner assembly according to claim 1 wherein:
   (a) the valve member comprises multiple, separate, valve sections.

5. A pulse jet air cleaner assembly according to claim 1 wherein:
   (a) the valve member is a sleeve member extending continuously around the housing sidewall.

6. A pulse jet air cleaner assembly according to claim 1 wherein:
   (a) the valve member holder comprises an adjustable hoop clamp.

7. A pulse jet air cleaner assembly according to claim 6 including:
   (a) a second removable hoop clamp temporarily secured over the second valve member second edge, for a water fording operation.

8. A pulse jet air cleaner assembly according to claim 1 wherein:
   (a) the air cleaner housing comprises a housing body and an access cover; and,
   (b) the evacuator valve assembly is mounted on the housing body.

9. A pulse jet air cleaner assembly according to claim 1 wherein:
   (a) the air cleaner housing comprises a housing body and an access cover; and,
   (b) the evacuator valve assembly is mounted on the access cover.

10. A pulse jet air cleaner assembly according to claim 1 wherein:
    (a) the air cleaner housing includes a drop tube;
    (b) the housing sidewall includes an outer sidewall of the drop tube with an aperture arrangement therein; and,
    (c) the evacuator valve assembly is mounted on the sidewall of the drop tube.

11. A pulse jet cleaner assembly according to claim 10 wherein:
    (a) the drop tube includes an open end closed by a second valve member.

12. A pulse jet air cleaner assembly according to claim 1 wherein:
    (a) the dust ejector port arrangement comprises a plurality of spaced ports positioned radially completely around a circumference of the housing sidewall.

13. A pulse jet air cleaner assembly according to claim 1 wherein:
    (a) the valve member is a sleeve member extending continuously around the housing sidewall and secured by a valve member holder spaced from each one of two opposite side edges of the valve member, such that each one of the two opposite side edges can flex open.

14. A pulse jet air cleaner assembly according to claim 1 wherein:
    (a) the air cleaner housing includes a compressed gas tank section therein.

15. A pulse jet air cleaner assembly according to claim 1 wherein:
    (a) the air cleaner includes a housing body with an end closed by an access cover; and (b) the valve member is positioned on the housing body with the first edge directed toward the access cover and with the second edge directed away from the access cover.

16. A method of installing an evacuator valve assembly on an air cleaner assembly; the method comprising steps of:
 (a) providing an air cleaner housing with an outer sidewall having a dust ejector port arrangement through; and,
 (b) positioning, on the housing, an evacuator valve assembly comprising:
  (i) a valve member including a sleeve member extending completely around the sidewall and in covering relation to the dust ejector port arrangement; and,
  (ii) at least one hoop clamp surrounding the sleeve member and securing the valve member in place.

17. A method according to claim 16 wherein:
 (a) the step of positioning comprises positioning the sleeve around a drop tube having a sidewall with an aperture arrangement therein.

18. A method according to claim 16 wherein:
 (a) the step of positioning comprises positioning the sleeve member around an access cover.

19. A method according to claim 16 wherein:
 (a) the step of positioning comprises positioning on a sidewall portion of a housing body section configured to receive and surround an installed filter cartridge.

20. A pulse jet air cleaner assembly comprising:
 (a) a housing having an outer sidewall with a dust ejector port arrangement therethrough; and,
 (b) an evacuator valve assembly comprising a flexible valve member having a 360° extension around the outer sidewall in valve closing relation to the dust ejector port arrangement.

21. A pulse jet air cleaner assembly according to claim 20 wherein:
 (a) the evacuator valve assembly includes a hoop clamp extending completely around the housing and securing the valve member in place.

22. A pulse jet air cleaner assembly according to claim 20 wherein:
 (a) the flexible valve member comprises a sleeve member with first and second, opposite edges;
  (i) the hoop clamp being positioned to secure the valve member from opening adjacent the first edge, while allowing the valve member to flex away from the housing, adjacent the second edge, to selectively open the evacuator valve assembly.

23. A pulse jet air cleaner assembly according to claim 20 wherein:
 (a) the flexible valve member comprises a sleeve member with first and second, opposite edges;
  (i) the hoop claim being positioned to allow the valve member to flex away from the housing adjacent each one of first and second, opposite, edges.

24. A pulse jet air cleaner assembly according to claim 20 wherein:
 (a) the outer sidewall comprises a sidewall of a drop tube; and,
 (b) the valve member is mounted on the sidewall of the drop tube.

25. A pulse jet air cleaner assembly according to claim 20 wherein:
 (a) the outer sidewall comprises a sidewall of an access cover; and,
 (b) the valve member is mounted around the access cover.

26. A pulse jet air cleaner assembly according to claim 20 wherein:
 (a) the outer sidewall comprises a portion of the housing configured to surround an installed filter cartridge; and,
 (b) the valve member is mounted around the portion of the housing configured to surround an installed filter cartridge.

* * * * *